(12) United States Patent
Wang et al.

(10) Patent No.: US 10,401,857 B2
(45) Date of Patent: Sep. 3, 2019

(54) SYSTEM AND METHOD FOR TRANSFORMING MISSION MODELS FROM PLAN GOAL GRAPH TO BAYESIAN NETWORK FOR AUTONOMOUS SYSTEM CONTROL

(71) Applicant: The Boeing Company, Chicago, IL (US)

(72) Inventors: Guijun Wang, Seattle, WA (US); Changzhou Wang, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 113 days.

(21) Appl. No.: 15/634,540

(22) Filed: Jun. 27, 2017

(65) Prior Publication Data
US 2018/0373247 A1 Dec. 27, 2018

(51) Int. Cl.
G05D 1/00 (2006.01)
G06N 7/00 (2006.01)

(52) U.S. Cl.
CPC ........... *G05D 1/0088* (2013.01); *G06N 7/005* (2013.01)

(58) Field of Classification Search
CPC .......................... G05D 1/0088; G06N 7/005
See application file for complete search history.

(56) References Cited

U.S. PATENT DOCUMENTS

2015/0186335 A1* 7/2015 Senalp ..................... G06N 5/00
703/2

OTHER PUBLICATIONS

Miller, C. et al., "Integrated Abstraction Hierarchy and Plan-Goal Graph Model for the DURESS II System: A Test Case for Unified System- and Task-based Modeling and Interface Design", 1998.
Miller, C. et al., "User Acceptance of an Intelligent User Interface: A Rotorcraft Pilot's Associate Example", Proceedings of the 4th International Conference on Intelligent User Interfaces, 1999.
Hong, J., "Goal Recognition through Goal Graph Analysis", Journal of Artificial Intelligence, 2001.
Geddes, N.D., "A model for intent interpretation for multiple agents with conflicts", Proceedings of the 1994 IEEE International Conference on Systems Man and Cybernetics, 1994.

\* cited by examiner

Primary Examiner — Michael D Lang
(74) Attorney, Agent, or Firm — MH2 Technology Law Group LLP

(57) ABSTRACT

A method and system operable to perform the method is provided for control of an autonomous or unmanned system. The method includes obtaining a mission model, wherein the mission model comprises a goal and one or more assets that are used to accomplish the goal; producing, by a first hardware processor, a plan goal graph (PGG) model based on the mission model; transforming, by a second hardware processor, the PGG model into a Bayesian Network (BN) model; computing a feasibility to execute a plan and an achievability of accomplishing the goal; and providing control instructions to the one or more assets to be used to accomplish the goal.

21 Claims, 31 Drawing Sheets

| ONE APACHE TWO UAVs | | | | | | | | | |
|---|---|---|---|---|---|---|---|---|---|
| ☐ | ONE APACHE ONE UAV | | | | | | | | |
| | ☐ | ONE APACHE | | | | | | | |
| | | ☐ | FEASIBLE | | FEASIBLE | | FEASIBLE | | |
| | | | | | ☐ | | ☐ | | |
| | | | | | FEASIBLE | | INFEASIBLE | | FEASIBLE |
| | | | | | ☐ | | ☐ | | ☐ |
| | | Target_Destroyed_dec... | One_Ap... | One_Ap... | One_Ap... | One_Ap... | One_Ap... | One_Ap... | One_A |
| △ | ACHIEVED | | 0.99 | 0.98 | 0.97 | 0.99 | 0.98 | 0 | 0.99 | 0 |
| | FAILED | | 0.01 | 0.02 | 0.03 | 0.01 | 0.02 | 1 | 0.01 | 1 |

FIG. 8

| TARGET LOCATED | ACHIEVED | | | | | | | |
|---|---|---|---|---|---|---|---|---|
| TARGET APPROACHED | ACHIEVED | | | | FAILED | | | |
| TARGET ATTACKED | ACHIEVED | | FAILED | | ACHIEVED | | FAILED | |
| BDA ASSESSED | ACHIEVED | FAILED | ACHIEVED | FAILED | ACHIEVED | FAILED | ACHIEVED | ACHIEVE |
| FEASIBLE | 1 | 0.75 | 0.75 | 0.5 | 0.75 | 0.5 | 0.5 | 0.7 |
| INFEASIBLE | 0 | 0.25 | 0.25 | 0.5 | 0.25 | 0.5 | 0.5 | 0.2 |

| P1:B→X|Y | FEASIBLE | | | | | | | | | | | | INFEASIBLE | | | | | | | | | | | |
|---|---|---|---|---|---|---|---|---|---|---|---|---|---|---|---|---|---|---|---|---|---|---|---|---|
| P2:B→X→Y | FEASIBLE | | | | | | INFEASIBLE | | | | | | FEASIBLE | | | | | | INFEASIBLE | | | | | |
| P3:B→Y→X | FEASIBLE | | | INFEASIBLE | | | FEASIBLE | | | INFEASIBLE | | | FEASIBLE | | | INFEASIBLE | | | FEASIBLE | | | INFEASIBLE | | |
| PLAN SELECTION | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 |
| ACHIEVED | .99 | .98 | .98 | .99 | .98 | 0 | .99 | 0 | 0 | .99 | 0 | 0 | 0 | .98 | .98 | 0 | .98 | 0 | 0 | 0 | .98 | 0 | 0 | 0 |
| FAILED | .01 | .02 | .02 | .01 | .02 | 1 | .01 | 1 | 1 | .01 | 1 | 1 | 1 | .02 | .02 | 1 | .02 | 1 | 1 | 1 | .02 | 1 | 1 | 1 |

FIG. 19

Table 2100

| B→X | ACHIEVED | | | | FAILED | | | |
|---|---|---|---|---|---|---|---|---|
| X→Y | ACHIEVED | | FAILED | | ACHIEVED | | FAILED | |
| Y→B | ACHIEVED | FAILED | ACHIEVED | FAILED | ACHIEVED | FAILED | ACHIEVED | FAILED |
| FEASIBLE | 1 | 2/3 | 2/3 | 1/3 | 2/3 | 1/3 | 1/3 | 0 |
| INFEASIBLE | 0 | 1/3 | 1/3 | 2/3 | 1/3 | 2/3 | 2/3 | 1 |

Table 2150

| B→X | ACHIEVED | | | | FAILED | | | |
|---|---|---|---|---|---|---|---|---|
| X→Y | ACHIEVED | | FAILED | | ACHIEVED | | FAILED | |
| Y→B | ACHIEVED | FAILED | ACHIEVED | FAILED | ACHIEVED | FAILED | ACHIEVED | FAILED |
| FEASIBLE | 1 | 2/3 | .6 | 1/3 | 8/15 | 4/15 | 16/75 | 0 |
| INFEASIBLE | 0 | 1/3 | .4 | 2/3 | 7/15 | 11/15 | 59/75 | 1 |

FIG. 21

SYSTEM AND METHOD FOR TRANSFORMING MISSION MODELS FROM PLAN GOAL GRAPH TO BAYESIAN NETWORK FOR AUTONOMOUS SYSTEM CONTROL

FIELD

The present disclosure relates generally autonomous or semi-autonomous cyber or physical systems in which an automated method and system for transforming mission models from Plan Goal Graph to Bayesian Network and for automated reasoning based on the transformed models.

BACKGROUND

A Plan Goal Graph (PGG) represents plan-goal relationships in a hierarchical structure. Plans and goals are decomposed following their means-ends relationships. A goal node in the PGG has plan nodes as children, which explicitly represent the alternative plans to achieve the goal. A plan node in the PGG has goal nodes as children, each of which represents a sub-goal of the planned task, collectively defines the objective of the plan. The leaf nodes are plan nodes corresponding to primitive actions that can be carried out in unit steps (e.g., carrying out a sequence of steps to execute a pre-defined operation).

Bayesian network (BN) (also called belief networks, or causal networks) is a probabilistic graphical model that represents a set of random variables and their conditional dependencies via a directed acyclic graph (DAG). A BN is a DAG where nodes represent random variables and edges represent conditional dependencies. Each node has an associated conditional probability table (CPT) that quantifies the conditional probability distribution over the states of the node given different combinations of the states of the parent nodes.

Bayesian network has been increasingly used for representing probabilistic knowledge. BN compactly represents the probabilistic dependencies among domain variables with the graphical structure. This quantified dependence representation provides a powerful reasoning platform following the Bayes' Theorem. Efficient algorithms have been developed to perform inference even with partial observation of variable states. In a Bayesian network, the posterior probabilities of variables can be computed given any other variables' state observations. The numerical value of posterior probabilities provides a quantitative estimation of the possible states of the unobserved variables. In the mission planning scenario, if the mission plans and goals are represented in Bayesian network models, the reasoning power of Bayesian networks can be used to evaluate the plans' feasibility and the goals' achievability.

Both PGG and BN are acyclic directed graph where nodes represent domain variables and arcs represent dependence relationships between the nodes. In PGG, a node is either a plan node or a goal node. Arcs from a plan node to its sub-goal nodes indicates collective relationship among all these sibling sub-goal nodes, i.e., all sub-goals must be met to complete the plan. Arcs from a goal node to its sub-plan nodes indicates alternative relationships among all these sibling sub-plan nodes, i.e., the goal may be met by choosing any of the plans.

By separating goals, plans, and sub-plans (i.e. actions to be performed to achieve the goals), a PGG is relatively easy for a person to create and understand. While PGG is an intuitive mission representation, it is informal and provides no formal reasoning theoretical foundation and practical mechanisms to compute probabilistic outcomes and based on which to reason and determine the course of actions. BN, on the other hand, is a formal probabilistic reasoning model with a rigorous theoretical foundation. Constructing a mission model in BN directly is challenging for complex mission systems (e.g., mission execution by autonomous vehicles) because of its lack of intuitive notation of plan-goal hierarchical decomposition.

Thus, a heretofore unaddressed need exists in the industry to address the aforementioned deficiencies and inadequacies.

SUMMARY

According to examples of the present disclosure, a method for control of an autonomous or unmanned system is provided. The method comprises obtaining a mission model, wherein the mission model comprises a goal and one or more assets that are used to accomplish the goal; producing, by a first hardware processor, a plan goal graph (PGG) model based on the mission model; transforming, by a second hardware processor, the PGG model into a Bayesian Network (BN) model; computing a feasibility to execute a plan and an achievability of accomplishing the goal; and providing control instructions to the one or more assets to be used to accomplish the goal.

In some examples, the one or more assets comprise an autonomous or unmanned system.

In some examples, the PGG comprises the goal represented as a first parent node and one or more alternative plans to achieve the goal utilizing the one or more assets represented as one or more first child nodes to the first parent node, wherein the first parent node is connected to each of the one or more first child nodes by one or more first directed arcs.

In some examples, the BN model comprises one or more alternative plans using the one or more assets represented as one or more second parent nodes and the goal represented as a second child node to the one or more second parent nodes, wherein the one or more second parent nodes are connected to the second child node by one or more second directed arcs.

In some examples, the transforming comprises changing a first direction of the first directed arcs to a second direction of the second directed arcs and adding a decision node to the second child node.

In some examples, the method further comprises defining one or more achievability variables for one or more goal nodes, defining one or more feasibility variables for one or more plan nodes, and a relationship between the one or more feasibility variables for the one or more plan nodes and the one or more achievability variables for the one or more goal nodes.

In some examples, the method further comprises generating a conditional probability table for each node of the BN model that reflects a conditional probability distribution over one or more states of a node given different combinations of the one or more states of each second parent nodes. In particular, a goal's achievability is computed based on a combination of available plans and their feasibilities, and decisions of selecting and executing those plans.

In some examples, the method further comprises adding a risk factor and a scaling factor in the computation of a plan's feasibility and a goal's achievability.

In some examples, the BN model and a computation method of computing an achievability of a goal node and one or more feasibility variables for one or more plan nodes are embedded in a mission reasoning component of an autonomous or semi-autonomous system to provide reasoning and decisions based on computed best course of actions. In some examples, the computed best course of action can be the available plan with the highest percentage of achieving the object of the goal based on one or more factors including, but is not limited to, availability of resources of the asset(s), cost of use of the resources of the asset(s), and environmental factors such as the weather. In some example, the computed best course can be the available plan with a percentage that meets a certain threshold of success, but not necessarily the course of action with the highest chance of success. If two different courses of action both meet the threshold, but the highest percentage course of action is impacted by one or more of the above factors, the course of action with the next highest percentage of success may be chosen.

In some examples, the first hardware processor and the second hardware processor are the same or different processors.

In some examples, the one or more assets comprise a robot equipped with wired or wireless communication, anthropomorphic hands and limbs, and a vision system. In some examples, the one or more assets comprise an autonomous air system, autonomous water system, or autonomous ground system. In some examples, the one or more assets comprise one or more of: a wireless communication system, a cargo stowage unit, a material handling equipment unit, a vision system, or a global positioning system.

In accordance with the present disclosure, a computing system is provided. The computing system comprises at least one hardware processor; a non-transitory computer-readable storing instruction, that when executed by the at least one hardware processor, perform a method for control of an autonomous or unmanned system, the method comprising: obtaining a mission model, wherein the mission model comprises a goal and one or more assets that are used to accomplish the goal; producing a plan goal graph (PGG) model based on the mission model; transforming the PGG model into a Bayesian Network (BN) model; computing a feasibility to execute a plan and an achievability of accomplishing a goal; and providing control instructions to the one or more assets to be used to accomplish the goal.

To enable adaptive control that makes use of information that becomes known during performance of a plan, in examples of the present disclosure, a PGG is translated into a BN that represents individual actions to be performed together with the observed probabilities of success and failure for the individual actions and the conditional probabilities of success and failure for the individual plans that depend upon certain environmental conditions or the outcome of certain other actions. A plan may be decomposed into sub-plans as combinations of individual actions and other sub-plans together with the conditional probabilities of success and failure for the sub-plans based upon their dependence on certain environmental conditions or the outcome of certain actions or certain other sub-plans.

By incorporating the relative probabilities of success and failure for individual actions and the conditional probabilities of success and failure for individual actions or sub-plans that depend upon environmental conditions or the outcome of other steps, a BN can be used to guide the course of action according to environmental conditions and the outcome of individual actions. Moreover, a BN can be used to guide incremental decisions to wait for more information, to wait for the outcome of other actions, or to take action to obtain more information.

Examples of the present disclosure provides for operations including, but are not limited to, the following: 1) transforming large mission models in form of intuitive but informal PGG notations into formal BN-based mission models for intelligent reasoning in support of complex, dynamic and high-tempo mission operations; 2) reasoning about goal achievability, plan feasibility, and the best courses of actions prior to mission executions; 3) dynamically updating goal achievability and plan feasibility given partial observation or estimation during simulated or actual mission executions.

Examples consistent with the present disclosure provide for a system and method to automatically transform a PGG to a BN, which is then enhanced as needed and used for formal reasoning on mission goals, plans, and their achievability and feasibility, respectively. A PGG is a hierarchical decomposition of a mission goal into alternative plans to achieve the goal and a plan into sub-goals to meet the plan's objectives. The decomposition is a tree structure alternating between goals and plans starting from the overall mission goal as the root and ending with the primitive plans as actionable unit steps. This disclosure creates an automated method for transforming a PGG-based mission representation to a BN-based mission representation and the resulting BN-based mission representation is then used for intelligent formal reasoning of mission goals, plans, and their achievability and feasibility. This method provides the ability to create large mission models using intuitive but informal PGG notations and transform the PGG-based mission models into formal BN-based mission models for intelligent formal reasoning in support of complex, dynamic and high-tempo mission operations.

The present disclosure provides for, among other things, (1) an automated transformation method from a PGG-based mission representation to a BN-based mission representation, (2) techniques for hierarchically computing goal achievability and plan feasibility using the resulting BN-based mission representation, and (3) continuous inference of goals and plans and keeping track of decisions and running estimate of goal achievability, plan feasibility with highlight of optimal paths in the BN-based graphical mission models.

Examples of the disclosure is applicable to examples of such systems as mission-critical command and control systems, cyber security defense and offense systems, fault analysis and root cause diagnosis systems, decision systems, and emergency management systems. The systems may include a robot equipped with wired or wireless communication, anthropomorphic hands and limbs, vision, etc. Moreover, the systems may include unmanned, autonomous air, water, or ground vehicles or systems equipped with wireless communication, cargo stowage, material handling equipment, vision, global positioning systems (GPS), etc. Further, the system may be any autonomous system equipped to perform the actions required to achieve a goal identified in a plan-goal-graph. The autonomous system may be controlled remotely by a computer through wired or wireless communication, or may be controlled locally by a computer physically resident with or in the autonomous system. In each example, the autonomous system is controlled in accordance with a mission model represented by a PGG or BN.

It is to be understood that both the foregoing general description and the following detailed description are exemplary and explanatory only and are not restrictive of the implementations, as claimed.

BRIEF DESCRIPTION OF THE DRAWINGS

FIG. 8 shows the conditional probability distribution of the goal node Target Destroyed being Achieved that is computed given the feasibility of the three plans and the selection of one of them using the Method εRDC, according to examples of the present disclosure.

FIG. 9 shows the generated CPT 900 for the plan node One Apache Two UAVs (plan 1 805 from FIG. 8).

FIG. 19 shows a conditioned probability table for the goal "Delivered" for the BN of FIG. 18.

FIG. 21 shows CPTs 2100 and 2150 for different conditions for plan 2 of FIG. 18.

DETAILED DESCRIPTION

Figure 1:
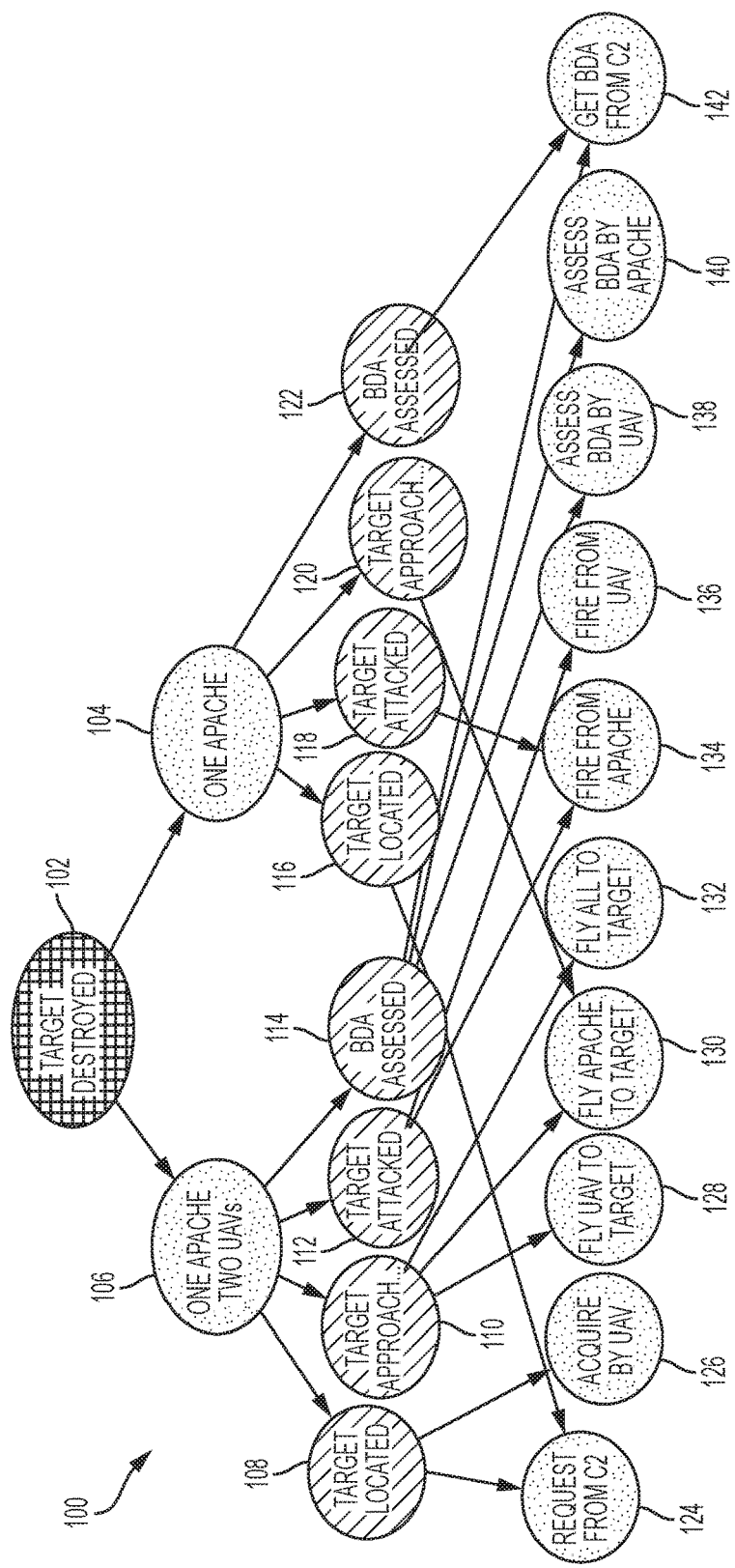
FIG. 1 shows an example of PGG modeling a mission to destroy enemy target with an Apache helicopter and two UAVs with the goal of getting the Target Destroyed that can be achieved by either of two plans—Plan A is to use one Apache two UAVs and Plan B is to use one Apache only, according to examples of the present disclosure.

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

Generally speaking, examples of the present disclosure provide for an automated system and method configured to transform mission models in PGG-based representation to corresponding models in BN-based representation for mission planning an execution for one or more assets including, but are not limited to manned systems and unmanned system (e.g., unmanned aerial vehicles (UAVs), unmanned aerial systems (UASs), unmanned ground vehicles (UGVs)). In some examples, the one or more assets comprise a robot equipped with wired or wireless communication, anthropomorphic hands and limbs, and a vision system. In some examples, the one or more assets comprise an autonomous air system, autonomous water system, or autonomous ground system. In some examples, the one or more assets comprise one or more of: a wireless communication system, a cargo stowage unit, a material handling equipment unit, a vision system, or a global positioning system.

Additionally, methods for quantitatively computing goal achievability and plan feasibility based on BN reasoning theories and formulas are provided. The transformation method and the achievability/feasibility computation algorithms further enable runtime reasoning in support of mission execution. The method, algorithms, and reasoning capability can be embedded in a variety of applications for automated or operator-in-the-loop complex mission systems. The automated transformation of mission models in PGG-based representation to corresponding models in BN-based representation preserves the structure and semantics of the mission model in PGG-based representation by reversing the parent-child relations between goals and plans, augments the basic structure of the BN-based model generated by the transformation method by adding a decision node in the BN for each goal node and linking the decision node as an additional parent to the goal node, and generates the state space and determine the probability of each state for each decision node. Moreover, conditional probabilities can be determined and assigned in each node's CPT. Furthermore, the goal's achievability and plan's feasibility can be computed recursively across the structure of the generated BN-based mission model based on sound BN reasoning theories and formulas. The methods, algorithms, and reasoning capabilities can be embedded in a variety of applications for automated or operator-in-the-loop complex mission systems and can provide continuous running estimate of plan's feasibility and goal's achievability during mission execution based on the generated mission models in BN-based representation.

In a typical PGG-based mission model, the ultimate goal of a mission is represented as a root node in the PGG and the goal is decomposed into alternative plans, each of which when carried out will achieve the goal. If a plan is not a primitive action that can be directly carried out, it is further decomposed into a set of sub-goals, all of which must be achieved in order to execute the plan. A Course of Action (COA) is a sequence of chosen plans that eventually achieve the mission goal at the root of a PGG. In this disclosure, the terms task and plan are used interchangeably.

One advantage of using PGG for mission representation is that it explicitly separates goals and plans (tasks). This distinction provides an intuitive mechanism to represent complex missions as a decomposition of a goal to alternative plans and a plan to a set of sub-goals. Conversely, a PGG-based model may be used as a basis to infer the operator's intent when tracking his/her actions that are linked to higher level of goals and plans.

However, one disadvantage of PGG is that it does not have a formal reasoning methodology for mathematically rigorous and theoretically sound inference. For instance, PGG does not define any methodology to address reasoning issues such as how to compute a goal's achievability given its child plans' feasibility (as probability of success), and similarly, how to compute a plan's feasibility given its sub-goals' achievability, and how to compute and recommend a COA that has the best probability of success based on the plans' feasibility and goals' achievability. With BN, the probabilistic dependencies can be represented explicitly and quantitatively in a directed acyclic graph with conditional probability tables. This representation allows for belief update to compute the nondeterministic plan feasibility and goal achievability.

In short, PGG is an intuitive model to represent hierarchical plan-goal relationships explicitly, but lacks formal methods to represent and reason quantitative properties (e.g., probability of success) of plans, goals, dependencies and constraints. FIG. 1 shows an example of PGG modeling a mission to destroy enemy target with an Apache helicopter and two UAVs 100 with the goal of getting the Target Destroyed 102 that can be achieved by either of two plans, according to examples of the present disclosure. The first plan is to only use one Apache 104 and the second plan is to use one Apache together with two UAVs 106. Both plans 104, 106 can be decomposed into four sub-goals: Target Located 108, 116, Target Approached 110, 118, Target Attacked 112, 120, and BDA Assessed 114, 122. These sub-goals each can be achieved by its decomposed plans. For example, in first plan of "One Apache" 104, the goal of Target Located 108 can be achieved by the means of a plan or primitive action to request it from a Command and Control center (C2) 124. The goal of Target Attacked 118 can be achieved by means of Fire from Apache 134. The goal of Target Approached 120 can be achieved by means of Fly Apache to Target 130. The goal of BDA Assessed 122 can be achieved by means of Get BDA from C2 142. For the second plan using "One Apache Two UAVs" 106, the goal of Target Located 108 can also be additionally achieved by the means of a plan or primitive action to acquire the target by UAV, which is represented by the plan node Acquire By UAV 126. The goal of Target Approached 110 can be achieved by means of Fly UAV to Target 128, Fly Apache to Target 130, or Fly All to Target 132. The goal of Target Attacked 112 can be achieved by means of Fire from Apache 134 or Fire from UAV 136. The goal of BDA Assessed 114 can be achieved by means of Assess BDA by UAV 138, Assess BDA by Apache 140, or Get BDA from C2 142.

Note the layered structure of PGG, starting with the mission goal at the top layer (root of the PGG tree), e.g., the node for Target Destroyed 102. The second layer is the plan nodes as children of the goal node in the first layer, e.g., the nodes for the first plan to use one Apache 104 and the node for the second plan is to use one Apache together with two UAVs 106. The third layer is the sub goal nodes, the children of the plan nodes in the second layer, so on so forth, e.g., the nodes for Target Located 108, 116, Target Approached 110, 118, Target Attacked 112, 120, and BDA Assessed 114, 122.

Figure 2:
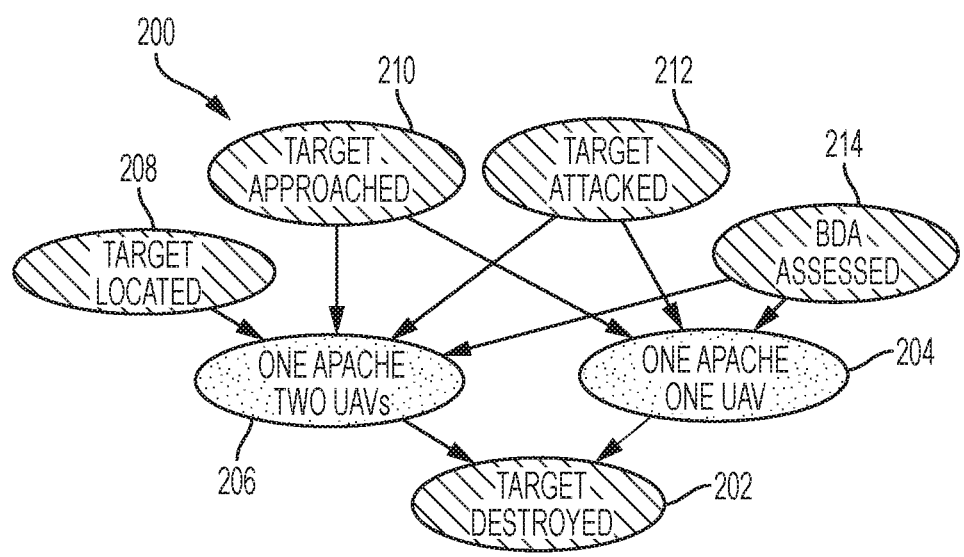
FIG. 2 shows an example of an intermediate step of creating a BN from a PPG model, which is a fragment of a BN for the mission goal of get Target Destroyed, according to examples of the present disclosure.
Figure 3:
FIG. 3 shows a conditional probability table 300 for the Target Destroyed goal node of FIG. 2 to represent the strength of the dependences, according to examples of the present disclosure.

FIG. 2 shows an example of a BN 200, which is an intermediate construct generated from the PGG of FIG. 1 by the disclosed PGG to BN model transformation method. The BN 200 is a fragment of a BN for the mission goal of get Target Destroyed 202, according to examples of the present disclosure. In this simplified network, the Target Destroyed goal node 202 is the child of two plans that can achieve this goal, i.e., the plan involving one Apache and one UAV 204 and the plan involving one Apache and two UAVs 206. The two plans 204, 206 are divided into four sub-goals: Target Located 208, Target Approached 210, Target Attacked 212, and BDA Assessed 214. The achievability of the goal depends on the success of the plans when executed. The parent-child relationship in the BN follows the causal relationship. If one of the plans is successfully carried out, then the goal will be highly likely achieved and the mission will be complete. FIG. 3 shows a conditional probability table 300 for the Target Destroyed goal node 202 of FIG. 2 to represent the strength of the dependences, according to examples of the present disclosure.

One disadvantage of BN is the complexity of model construction. Building Bayesian networks for complex mission scenarios, especially for autonomous cyber or physical systems, requires major investment in not only modeling domain knowledge, but also understanding BN theory and techniques. Tools are developed to facilitate the Bayesian network modeling. However, compared with PGG, constructing a mission model in BN is not as intuitive as in PGG.

To combine the advantages of easy construction of PGGs and powerful reasoning capability of BNs, this disclosure provides a system and method to transform PGGs to BNs automatically. This method transforms concepts and constructs in a PGG to concepts and constructs in a BN. The transformation preserves the semantics of the concepts of goals and plans and their relationships in PGG and adds extensions for formal reasoning on goals, plans, and course of actions. In addition, constructs not present in PGG are automated added and fused to the initial BN model transformed from the PGG model. Furthermore, formal relationships of goal's Achievability and Plan's Feasibility are defined and incorporated in the initial BN model transformed from the PGG model. Computation of the goal's Achievability and Plan's Feasibility is also created in the initial BN model transformed from the PGG model. Finally, the reasoning capability using the BN model is enhanced to provide intelligent decision support to mission operators or autonomous decision making using quantitative feasibility and achievability computations based on BN's rigorous conditional probability theory. The method for graphical structure transformation and the conditional probability distribution estimation is described below.

A PGG starts with a goal node and spans its graph structure with one or more plans as children nodes. Each plan node spans the graph structure further with multiple sub-goal nodes. Recursively, the goal-plan structure and plan-goal structure specify the hierarchical decomposition of abstract goals or plans into concrete tasks or actions. The leaf nodes of the PGG tree structure are the primitive tasks or actions that a machine or a human operator can carry out. The relationship as an arc between a parent node and a child node in PGG, i.e., between a goal and a plan to achieve the goal or between a plan and a sub-goal to be achieved, is a decomposition relationship.

When transforming a PGG structure to a BN structure, the graphical structure is preserved including concepts, constructs, and their semantics. This structure preserving feature is an element of our innovation method.

Figure 4:
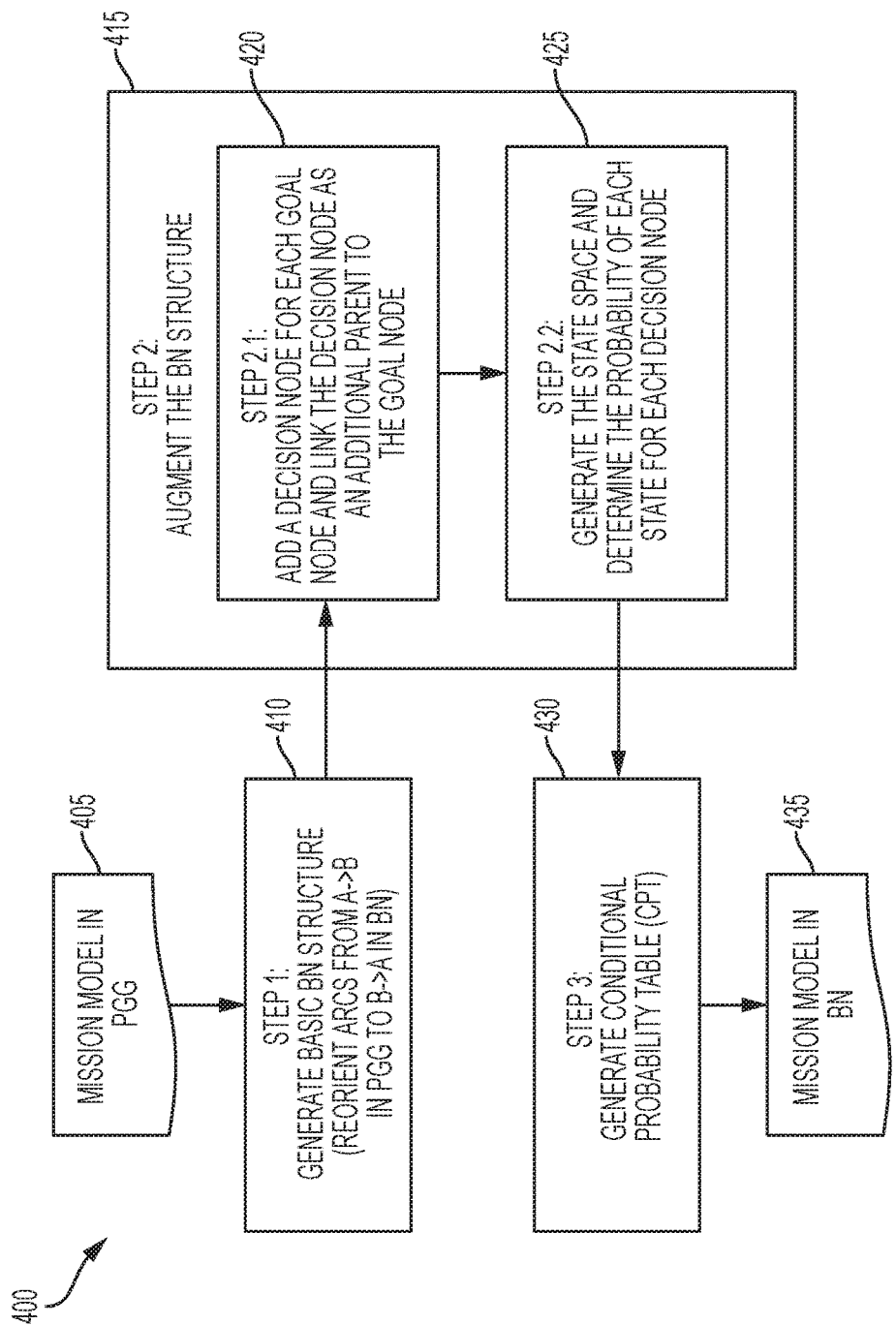
FIG. 4 shows an automatic transformation method 400 of a PGG model and generation of a BN model, according to examples of the present disclosure.

FIG. 4 shows an automatic transformation method 400 of a PGG model and generation of a BN model, according to examples of the present disclosure. The transformation takes two logical steps. The method 400 begins by reversing, at 405, the directions for all arcs so that a relationship A→B in the PGG becomes a relationship B→A in its counterpart BN. One insight of the arc direction reversion is that the decomposition relationship between a parent node and a child node in PGG is semantically equivalent to a dependency relationship between them where the parent's success, measured as a plan's feasibility or a goal's achievability for example, depends on the child's success. For instance, a goal's achievability depends on all its alternate plans' feasibilities. And similarly, a plan's feasibility depends on all its subgoals' achievability. The reversion of the arcs' directions follows the causal relationships among plans and goals for explicit and compact representation in the BN model.

Another insight of the arc direction reversion is that the leaf nodes of the PGG are the primitive tasks whose feasibilities are determined by environmental factors other than goals and other plans represented in the PGG/BN mission models. Their chances of success are independent of other nodes in the mission models. Therefore, in BN model, these nodes should be parentless nodes and their CPTs simply represent the prior probabilities of their states (i.e., success or failure) respectively.

Yet another insight of the arc direction reversion is that the goal nodes and plan nodes in PGG represent mission goals and decomposable plans whose success often involves uncertainty rather than completely deterministic. The reversion of the arc directions helps reduce the complexity of the resulted BN model both in terms of structure and in conditional probability tables. It helps minimize the number of parameters to encode the CPTs.

The method 400 continues by augmenting, at 415, the basic structure of the BN generated at 410. The augmenting at 415 can be subdivided into 420 and 415, where, at 420, a decision node is added in the BN for each goal node and link the decision node as an additional parent to the goal node (technically, the resulting BN is an Influence Diagram, but is still called BN for simplicity). The reason for doing this is to represent plan choices made by human operators, as goal achievability depends on the selected plans. Keep in mind that a goal may be achieved by multiple plans (e.g., in an alternate relationship). In the PGG, the goal is the parent of these plans. In the BN, these plans are the parent of the goal node. The addition of decision nodes is automated, one for each goal node, in this step.

Then, at 425, once decision nodes are added to the BN, the state space is generated and the probability of each state for each decision node is determined. The number of the possible states of the decision node equals to the number of the child plans for the goal which is the child of the decision node. The $i^{th}$ state of the decision node indicates the $i^{th}$ child plan being selected by human operators. The decision node is a deterministic node representing the scenario that, when one of its states is selected, the corresponding plan would be chosen to fulfill the goal. By default, each plan has equal probability being selected among all alternate sibling plans. The method 400 continues by generating, at 430, the Conditional Probability Tables (CPT) for the nodes in the BN, which is further described below. The method 400 concludes by generating, at 435, the mission model in BN.

Figure 5:
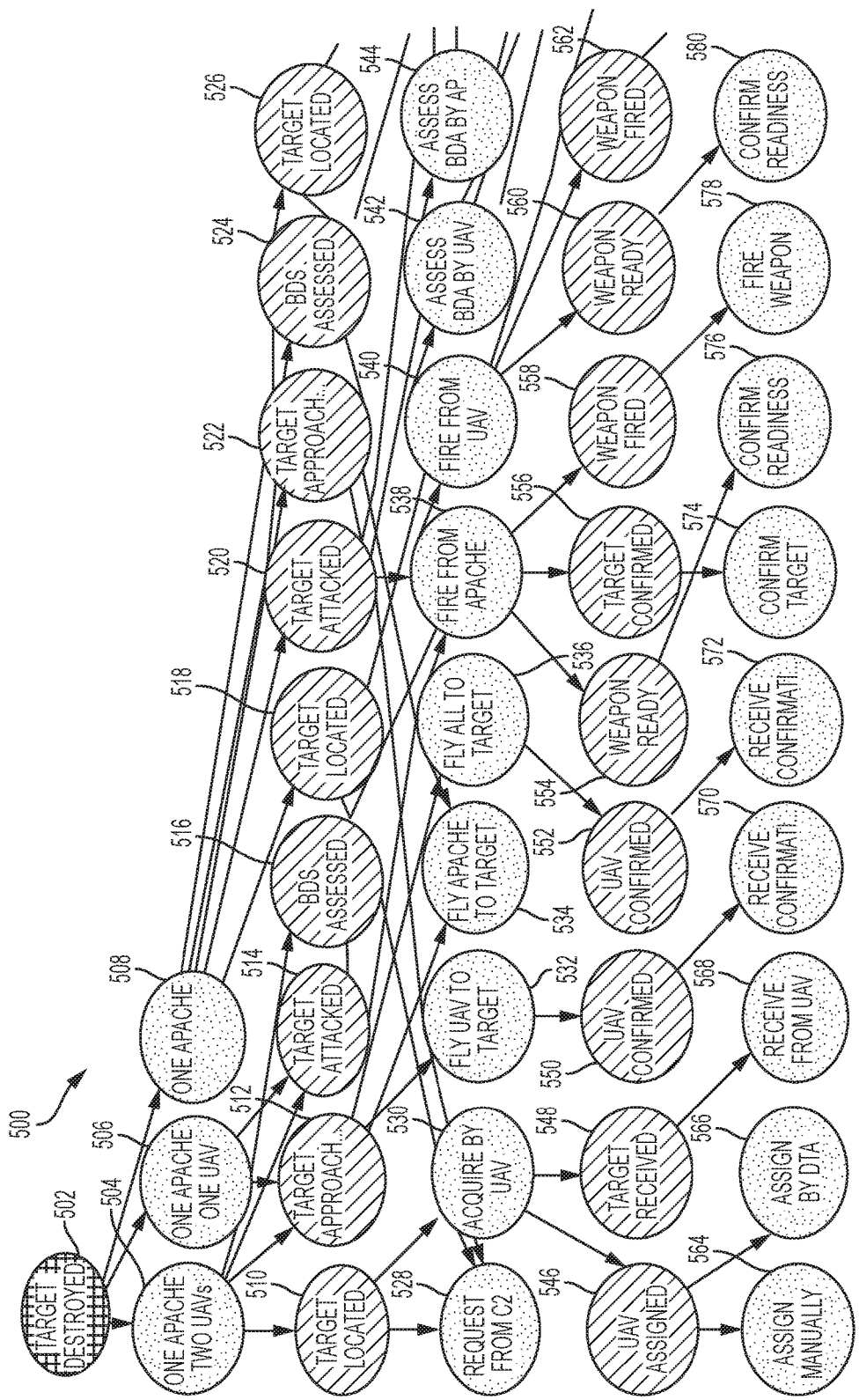
FIG. 5 shows a PGG that represents a mission to destroy an enemy target with different choices of Apache helicopters and UAVs as available resources, according to examples of the present disclosure.

FIG. 5 shows a PGG 500 that represents a mission to destroy an enemy target with different choices of Apache helicopters and UAVs as available resources, according to examples of the present disclosure. The PGG 500 include three plans to accomplish the goal of target destroyed 502. The first plan is to use one Apache and two UAVs 504, all to be deployed to destroy the enemy target. The second plan is to use one Apache and one UAV 506. The third plan is to use only one Apache without a UAV 508. Each plan has four sub-goals respectively, namely, Target Located 510, 518, 526, Target Approached 512, 522, Target Attacked 514, 520, and BDS Assessed 516, 524. As can be seen, all three action plans are children nodes of the Target Destroyed goal node 502 (the root of the PGG), each of the three plan nodes has four children nodes corresponding to the four sub-goal nodes. In FIG. 5, the plan nodes are one Apache two UAVs 504, one Apache one UAV 506, one Apache 508, Request from C2 528, Acquire by UAV 530, Fly UAV to Target 532, Fly Apache to Target 534, Fly All to Target 536, Fire from Apache 538, Fire from UAV 540, Assess BDA by UAV 542, Assess BDA by Apache 544, Assign Manually 564, Assign by DTA 566, Receive from UAV 568, Receive Confirmation 570, Receive Confirmation 572, Confirm Target 574, Confirm Readiness 576, Fire Weapon 578, and Confirm Readiness 580. The goal nodes are Target Located 510, Target Approached 512, Target Attacked 514, BDS Assessed 516, Target Located 518, Target Attacked 520, Target Approached 522, BDS Assessed 524, Target Located 526, UAV Assigned 546, Target Received 548, UAV Confirmed 550, UAV Confirmed 552, Weapon Ready 554, Target Confirmed 556, Weapon Fired 558, Weapon Ready 560, and Weapon Fired 562. Note that the figure only shows a partial picture of the PGG structure.

Figure 6:
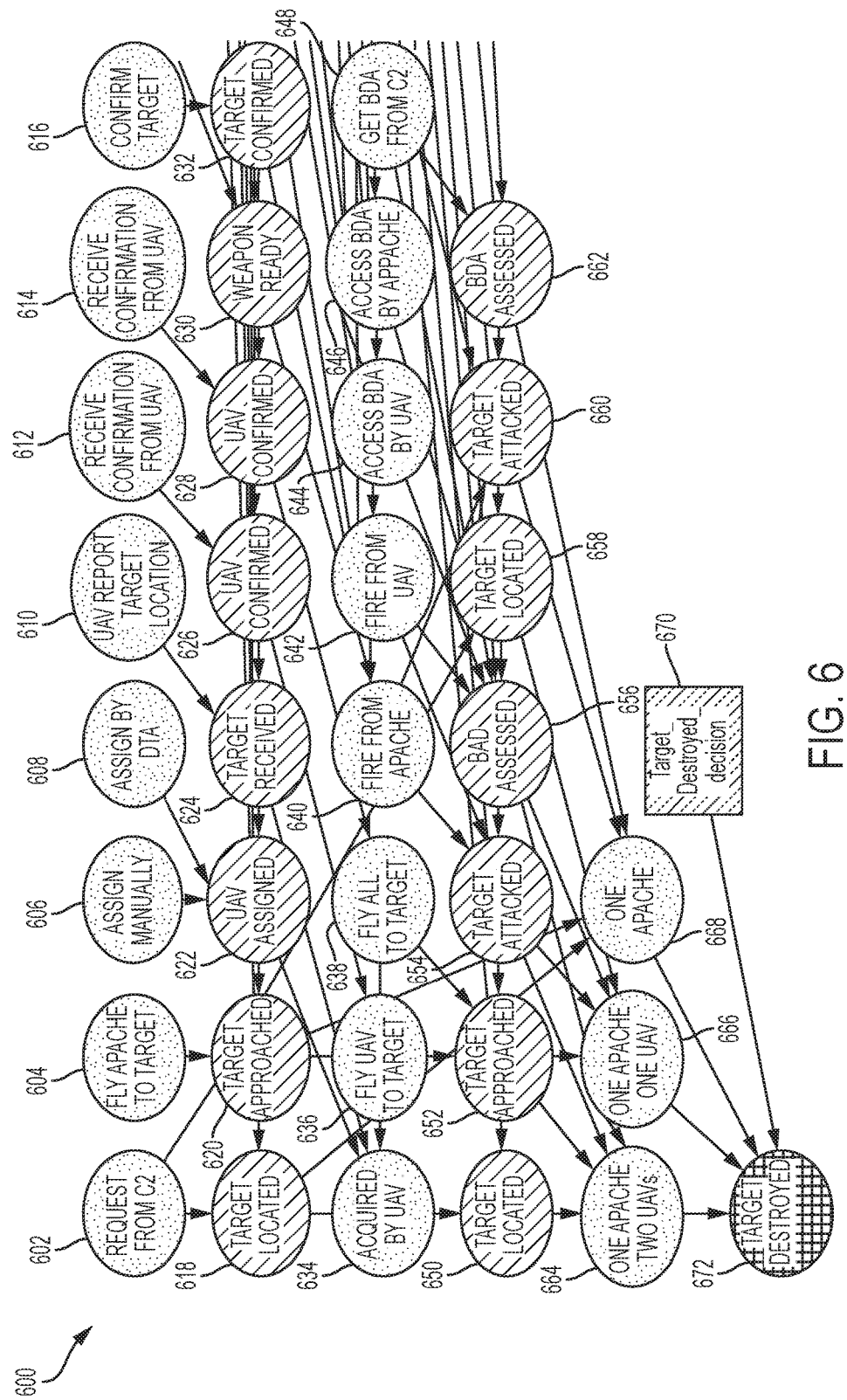
FIG. 6 is the BN generated by transforming the PGG in FIG. 5.

FIG. 6 is the BN generated by transforming the PGG in FIG. 5. Note that the graph structure is upside down compared with the original PGG with reversions of the parent-children relationship. The constructs of decision nodes as parents to the goal nodes are then added and fused into the model. The addition of decision nodes is an important part of the transformation. The figure only shows a partial picture of the BN structure for illustration. In FIG. 6, same as in PGG, the plan nodes are Request from C2 602, Flay Apache to Target 604, Assign Manually 606, Assign by DTA 608, UAV Report Target Location 610, Receive Confirmation 612, Receive Confirmation from UAV 614, Confirm Target 616, Acquire by UAV 634, Fly UAV to Target 636, Fly All to Target 638, Fire from Apache 640, Fire from UAV 642, Assess BDA by UAV 644, Assess BDA by Apache 646, Get BDA from C2 648, one Apache two UAVs 664, one Apache one UAV 666, and one Apache 668. The goal nodes are Target Located 618, Target Approached 620, UAV Assigned 622, Target Received 624, UAV Confirmed 626, UAV Confirmed 628, Weapon Ready 630, Target Confirmed 632, Target Located 650, Target Approached 652, Target Attacked 654, BDA Assessed 656, Target Located 658, Target Attacked 660, and BDA Assessed 662. These nodes are all random variables in oval shape. The decision nodes are rectangular nodes, i.e., Target Destroyed Decision 670. The root goal node is Target Destroyed 672. The arcs point from parents to children to indicate their causal effectual relationships.

Beside the graph structure, a BN has another important part: Conditional Probability Distributions (CPD). In a BN, a parentless node is defined with a prior probability distribution function (for continuous variables) or table (for discrete variables). A node having parents is represented with a conditional probability function or table which defines the probabilities of the variable given the joint states of its parents. In this disclosure, the method of generating CPD only on discrete variables is illustrated and thus only Conditional Probability Tables (CPT) are needed.

Typically in a PGG, nodes are discrete variables, therefore, in this disclosure, the focus is on how to generate Conditional Probability Tables (CPT) for discrete variables. Furthermore, the terms "node" and "variable" are used interchangeably to simplify the description of the approach.

Returning to FIG. 4, the CPT are generated, at 430, for BN-based mission model, as shown in FIG. 6. Note that a node's CPT represents the joint states of all possible combinations of its parent states and the node's own state. Due to this multidimensional and combinatorial nature, it requires exponential number of parameters to populate a CPT. For a binary state node with n binary state parents, the number of parameters in its CPT is $2^n$. (A binary state node is a node with two states, e.g., yes/no, achieved/failed).

To illustrate the power of automatic BN model generations, the focus is on the capability of automatically assessing plan feasibility and goal achievability. For simplicity, goals and plans are modeled as binary state nodes in BN. A goal node has two states: Achieved or Failed; a plan node has two states: Feasible and Infeasible. For a goal $N_G$ with m alternative child plans N (i=1, 2, . . . m) to achieve the goal, its parent decision node has m number states. When the goal and plans are modeled as binary state nodes, its CPT is an m+2 dimensional table, and it requires $m*2^{m+1}$ number of probability parameters.

When generating the CPT table for a goal node $N_G$, uncertainties are introduced such that when a plan $N_{Pi}$ is feasible and chosen to be carried out, the achievability of $N_G$, takes a probability value 1−ε, where ε represents any unexpected factors to prevent the goal from being achieved after the plan is executed. In other words, ε represents an inherent mission risk factor. Clearly, when such uncertainty does not exist, let ε=0. For simplicity of discussion, ε is assumed to be a constant.

Figure 7:
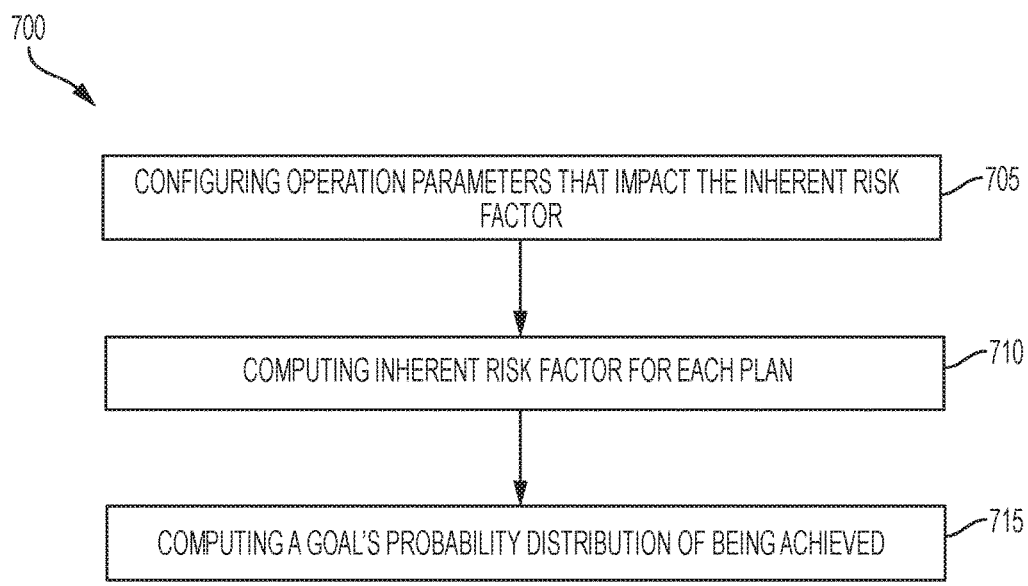
FIG. 7 shows a method 700 for computing the conditional probability of a goal being Achieved given the feasibility of one of its plans is being chosen, according to examples of the present disclosure.

By definition of the model, a goal may be achieved by selecting any of the plans, provided a selected plan is Feasible. FIG. 7 shows a method 700 for computing the conditional probability of a goal being Achieved given the feasibility of one of its plans is being chosen, according to examples of the present disclosure. The method 700 begins by configuring, at 705, operation parameters that impact the inherent risk factor ε as the probability of a plan that is Feasible but still could fail when it is executed. Select methods to compute the inherent risk factor ε based on the operation parameters.

The method 700 continues by computing, at 710, an inherent risk factor ε for each plan. It is obvious that when the plan is Infeasible, ε=1, i.e., 100% of fail probability. If the plan is Feasible, the computation of ε can be done in multiple automated methods. As an example, a method (termed "Method εRDC") is to assess the redundancies in a plan—the more redundant assets used in a plan, the less risk to fail—in comparison of maximum redundancies in all plans for achieving a goal. In this example method, the operation parameters are the max number of assets in a mission and the available redundant assets in a particular plan. As another example, a method (termed "Method εCPX") is to estimate the complexity of a plan by means of the number of assets that must be coordinated. The more complex, the more risk and thus higher ε value. In this example method, the operation parameter are the number of assets and the complexity of coordination among them in a mission. The computed ε value may be manually adjusted by operator.

The method 700 concludes by computing, at 715, a goal's probability distribution of being Achieved as 1−ε under each condition of a plan is chosen and whether the plan is Feasible or Infeasible, where ε is the computed risk factor of the plan computed in 710.

To demonstrate the process of computing the conditional probability distribution, the goal of Target Destroyed and its three sub-plans are used as an example. As shown in FIG. 8, the conditional probability distribution 800 of the goal node Target Destroyed being Achieved is computed given the feasibility of the three plans and the selection of one of them using the Method εRDC. The risk factor ε is first computed as the conditional probability when the goal is Failed but a Feasible plan is selected using a function of (number of available redundancies of assets to execute a plan):(1+((total number of available redundancies of assets)−(number of redundancies of assets to execute the selected plan))*θ, where θ is a scaling factor for the goal. The scaling factor for many goals may be the same, but some goals may have different scaling factors, as determined by the operators. Then the conditional probability when the goal is Achieved is apparently 1−ε. On the other hand, as mentioned earlier, the risk factor ε is always 1 when an Infeasible is selected to execute, and hence the conditional probability is 0 for the goal being Achieved when an infeasible plan is selected (regardless the feasibility of other plans).

For example, assume the scaling factor θ is determined as 1% by the operator. In the following, the conditional probabilities are computed when all the three plans are Feasible for each of the three cases where each plan is selected to execute. Note that here the maximum number of available assets is 3: one Apache plus two UAVs. In this example, the method εRDC is selected to compute the risk factor ε.

Plan 1 805: One Apache Two UAVs is chosen to be executed: here the number of available redundant assets to execute Plan 1 is 3. Hence, ε=(1+(3−3))*0.01=0.01.

Therefore, the conditional probability of the goal node Target Destroyed being Achieved when all plans are Feasible and Plan 1 805: One Apache Two UAVs chosen to be executed is 1−ε=1−0.01=0.99. Plan 2 810: One Apache One UAV is chosen to be executed: here the number of available redundant assets to execute Plan 2 810 is 2 (as 1 of the 2 UAVs is not available). For this Plan 2 810, ε=(1+(3−2))*0.01=0.02.

Therefore, the conditional probability of the goal node Target Destroyed being Achieved when all plans are Feasible and Plan 2 810: One Apache One UAV is chosen to be executed is 1−ε=1−0.02=0.98.

Plan 3 815: One Apache is chosen to be executed: here the number of available redundant assets to execute Plan 3 is 1 (the Apache). For this Plan 3 815, ε=(1+(3−1))*0.01=0.03.

Therefore, the conditional probability of the goal node Target Destroyed being Achieved when all plans are Feasible and Plan 3 815: One Apache is chosen to be executed is 1−ε=1−0.03=0.97.

In this example, the feasibility of un-selected plan does not play a role in the computation. For example, the conditional probability of the goal node Target Destroyed being Achieved when Plan 1 805 is Feasible and chosen to be executed while Plan 2 810 or Plan 3 815 is Infeasible is the same: 0.99. Apparently, using this approach, the operators only need to determine the scaling factor θ for each goal as they develop mission plans. The exponential number of probabilities in the conditional probability table is determined automatically using the algorithm described above.

Alternative methods may be used to compute the ε for each plan and the value of ε may be adjusted by operators manually through means direct change or via a parameterized input table. As noted earlier, a plan is not feasible but chosen to achieve its goal, then ε=1 and the achievability of the goal should be zero. The CPT cells corresponding to such cases have values of 0 for Achieved state and 1 for Failed outcome, as shown in FIG. 8.

In summary, when generating CPT for a goal node, the default CPT values are computed conditioned on each of its feasible plans consistent with its decision parent's choice state. When a parent plan is in its Feasible state and the parent decision node is in a state of choosing this plan, the goal's state of being Achieved is computed as probability value 1−ε, where ε is a computed risk factor of executing the plan; when a parent plan is in its Infeasible state but the parent decision node is in a state of choosing this plan, then the goal's state of being Achieved is zero probability value because ε=1.

In generating CPT for a plan node, the CPT values are assigned in a quite different way. The probability of a plan's Feasible state equals to the ratio of its Achieved sub-goals out of the total number of the plan's sub-goals.

In a BN, a plan node has its supported sub-goals as its parent nodes after transforming from the original PGG. For a plan node $N_p$ with $N_{Si}$ (i=1, . . . , m) sub-goal parent nodes, its CPT has m+1 dimensions and requires $2^{m+1}$ number of probability parameters. When all of the sub-goals are in the state of being Achieved, then the plan must be 100% feasible and its corresponding CPT cell takes value of 1. When k out of m sub-goals are Achieved, then the plan has k/m probability being feasible. When none of the sub-goals can be achieved, then the plan's feasibility is zero. FIG. 9 shows the generated CPT 900 for the plan node One Apache Two UAVs (plan 1 805 from FIG. 8).

The method of FIG. 7 can be used to generate default CPTs for the BN-based mission model. The generated model may be updated by domain experts through graphical tools.

With the BN representation of the dependencies among plans and goals, and an operator's choice of alternative plans, the operator can be provided with a quantified assessment on the chance of success of various choices. The plan feasibility and goal achievability are dynamically computed, driven by external events and operator decisions. For plan feasibility, the computation is a bottom-up belief propagation starting from setting the state of leaf plans (primitive actions whose feasibility can be determined by various external influential factor such as resource availability and communication capability for a mission execution). The goal achievability depends on its alternative child plans and is computed based on the child plans' feasibility update. These belief updates are propagated up to the root goal through plan-goal layers and the ultimate goal feasibility can be assessed once the belief propagation is completed. The operator can immediately see the estimated rate of mission success from the Bayesian reasoning result. Comparing the rate for each alternative plan choices, the operator can easily pick the best plan for achieve the goal. This process can easily be performed autonomously when operator intervention is not required.

Figure 10:
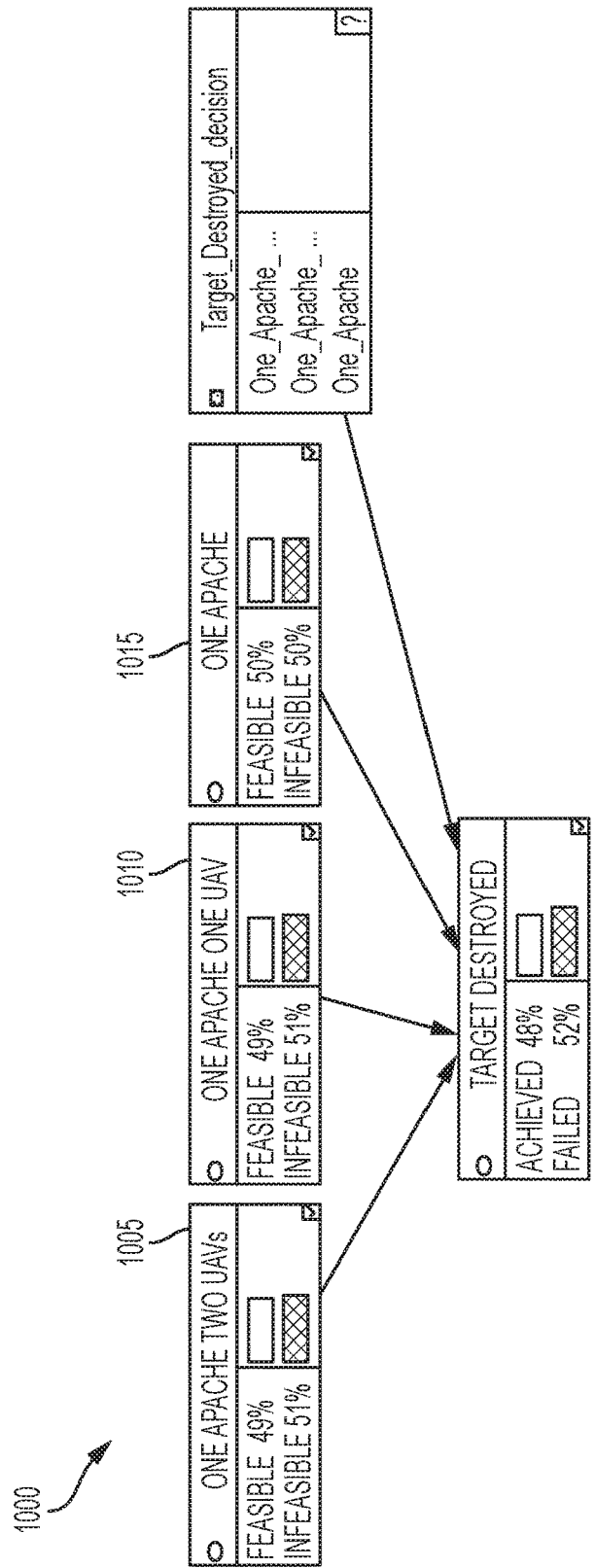
FIG. 10 shows the priori probability 1000 of the goal "Target Destroyed" and the feasibility of its three alternative child plans to achieve the goal, according to examples of the present disclosure.

A state-of-the-art BN inference algorithm can be used for computation of plan feasibility and goal achievability. In the BN models generated using the present methods, the layered structure of PGG is kept, the observable states of primitive action plans are set as evidences to infer the posterior probabilities for estimating achievability of the goal nodes and feasibility of the plan nodes. When no evidence is present, a priori probabilities are computed for the estimation. FIG. 10 shows the priori probability 1000 of the goal "Target Destroyed" and the feasibility of its three alternative child plans to achieve the goal, according to examples of the present disclosure. Note that the success and failure rates are roughly equal, about 50%. The plan "One Apache Two UAVs" 1005 has a little lower feasibility compared to other two plans, e.g., the plan "One Apache One UAV" 1010 and the plan "One Apache" 1015, as it requires more resources (i.e., two UAVs) that may result in higher risk of resource being unavailable.

When reasoning with BN for achievability of a goal G, G's marginal probability p(G) is computed. The calculation follows Bayes' Theorem by summing out of its parent variables (P1, P2, . . . Pn). This process is called marginalization. Here p(G) is used to represent the probability of Goal G being in the Achieved state, p(G=Achieved), and p(P) to represent the probability of Plan P being in the Feasible state, p(P=Feasible). The p(G=Failed) is the complement of the p(G=Achieved), therefore p(G=Failed)=1−p(G=Achieved). For the plan node, the complement relationship holds true for the Infeasible state and Feasible state: p(P=Infeasible)=1−p(P=Feasible).

When no decision is made on plan choices, each plan is treated with equal chance of being selected, all plans have the same influence on the goal's achievability.

$$p(G) = \sum_{P1,\ldots,Pn} p(G \mid P1, \ldots Pn) p(P1, \ldots Pn)$$

When a decision is made on plan choices, the goal's achievability depends on the selected plan's feasibility. The unselected plans won't have any effect to the goal's achievability in this situation.

Figure 11:
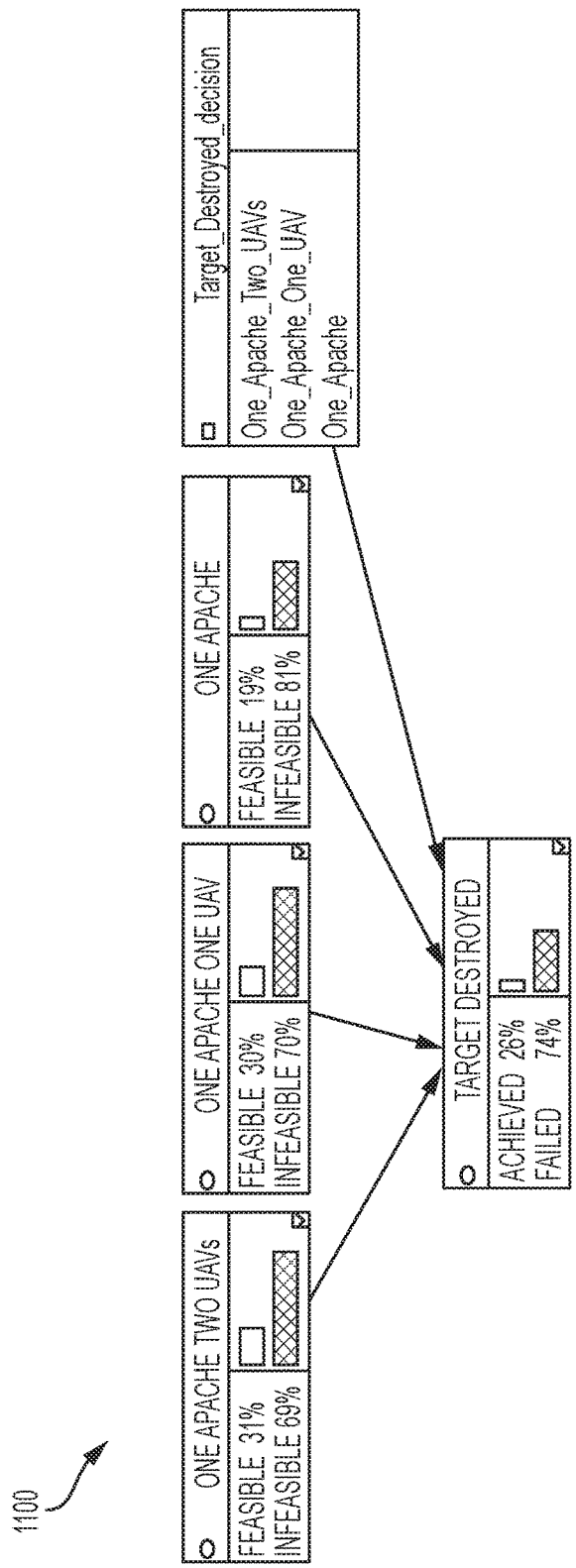
FIG. 11 illustrates the achievability of goal Target Destroyed when no plan is selected (i.e., all plans are equally likely to be chosen by default), according to examples of the present disclosure.

FIG. 11 illustrates the achievability 1100 of goal Target Destroyed when no plan is selected, p(Target Destroyed)=26%.

Figure 12:
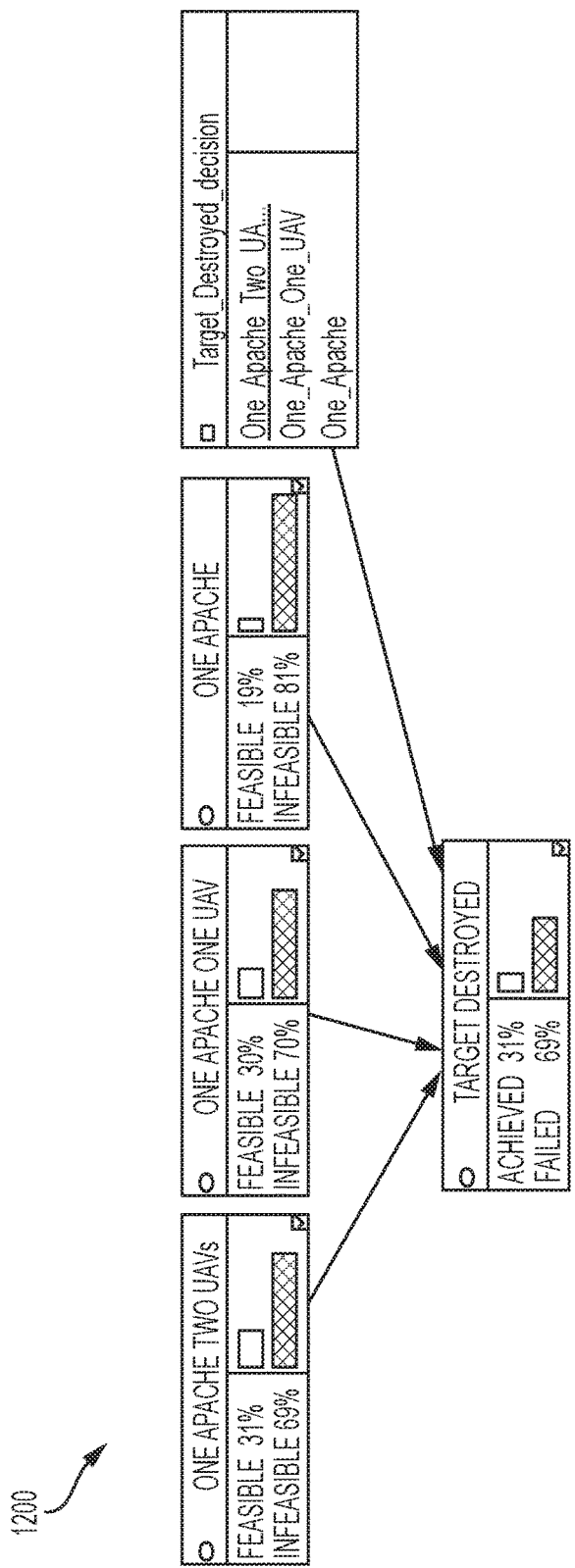
FIG. 12 illustrates the same variable when One Apache Two UAVs is selected as the plan to achieve the goal 1200, according to examples of the present disclosure.

FIG. 12 illustrates the same variable when One Apache Two UAVs is selected as the plan to achieve the goal 1200, according to examples of the present disclosure. As can be seen, under this situation, p(Target Destroyed)=p(One Apache Two UAVs)=31%. In FIG. 12, the first state, ONE_Apache_Two_UAV 1205 of the Target_Destroyed_decision node 1210 is the selected plan.

Note that both estimated values for the goal achievability are low, 26% and 31%. This is because all the involved plans' feasibilities are low in the given situations, as they depend on the upper layer nodes' state and their corresponding probabilities, which ultimately depend on the first layer nodes, i.e., the primitive action nodes. In the illustrated settings, those action nodes were not set to favor the feasible state. They have equal chance of being feasible or infeasible. These nodes are not shown in the figures for simplified illustration of probability dependency among the goal node Target Destroyed and its plans and decision nodes.

Similar to the assessment of goal achievability, the assessment of plan assessment also follows Bayes' Theorem. For a plan node P with n goal node parents G1, . . . Gn, its probability is the marginal sum out of the goals' probability.

$$p(P) = \sum_{G1,\ldots,Gn} p(P \mid G1, \ldots Gn) p(G1, \ldots Gn)$$

When sub-goals are achieved with certain probability, their parent plan's feasibility can be computed and updated accordingly. Generally, increase of the sub-goals' achievability will increase the plan's feasibility. When all sub-goals are known (100% certain) to be achieved, the plan's feasibility is 100%.

Figure 13:
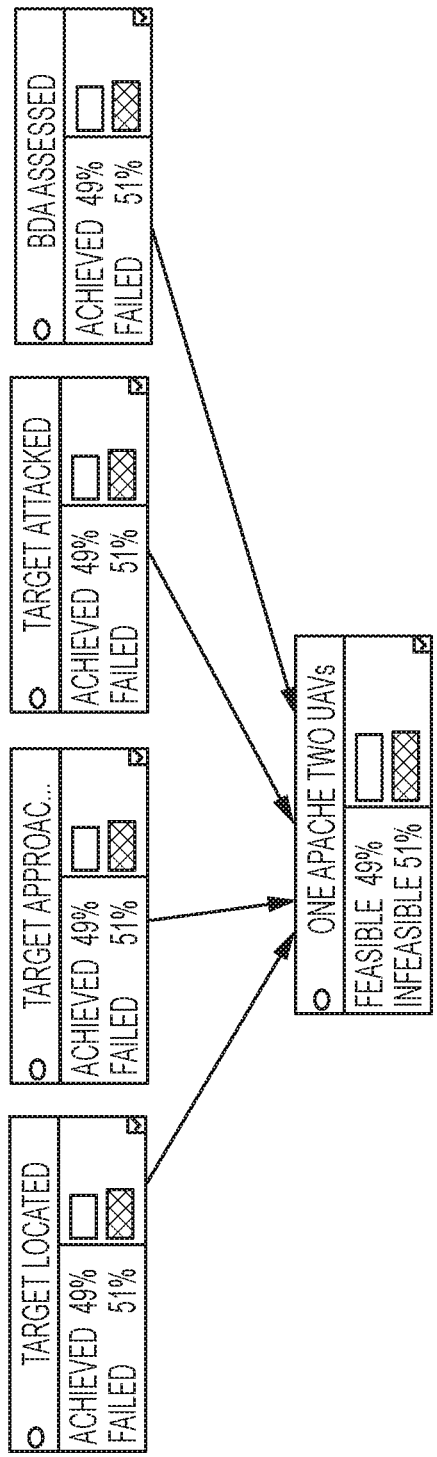
FIG. 13 shows the probabilistic update of the plan One Apache Two UAVs according to its four sub-goals' state change, where all of its sub-goals have 49% probability to be achieved, and the plan's feasibility is also 49%.
Figure 14:
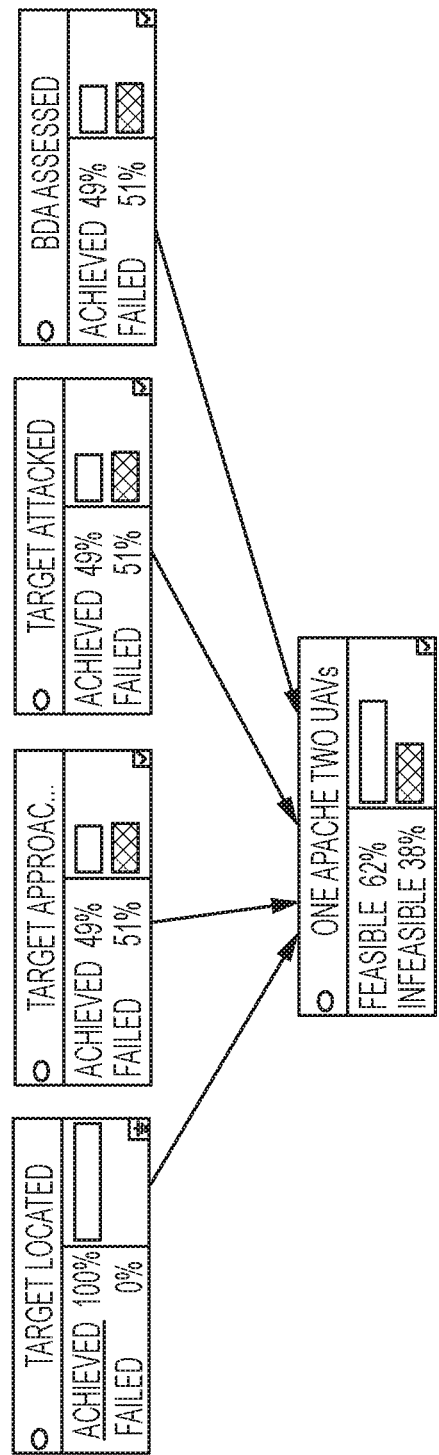
FIG. 14 shows the probabilistic update of the plan One Apache Two UAVs according to its four sub-goals' state change, where when one of its sub-goals is known for sure being achieved (shown as 100% of the corresponding state), then the plan's feasibility increases to 62%.

FIG. 13 and FIG. 14 show the probabilistic update of the plan One Apache Two UAVs according to its four sub-goals' state change. In FIG. 13, all of its sub-goals have 49% probability to be achieved, and the plan's feasibility is also 49%. In FIG. 14, when one of its sub-goals is know for sure being achieved (shown as 100% of the corresponding state), then the plan's feasibility increases to 62%. The more certain its sub-goals get achieved, the greater the parent plan's feasibility is.

Figure 15:
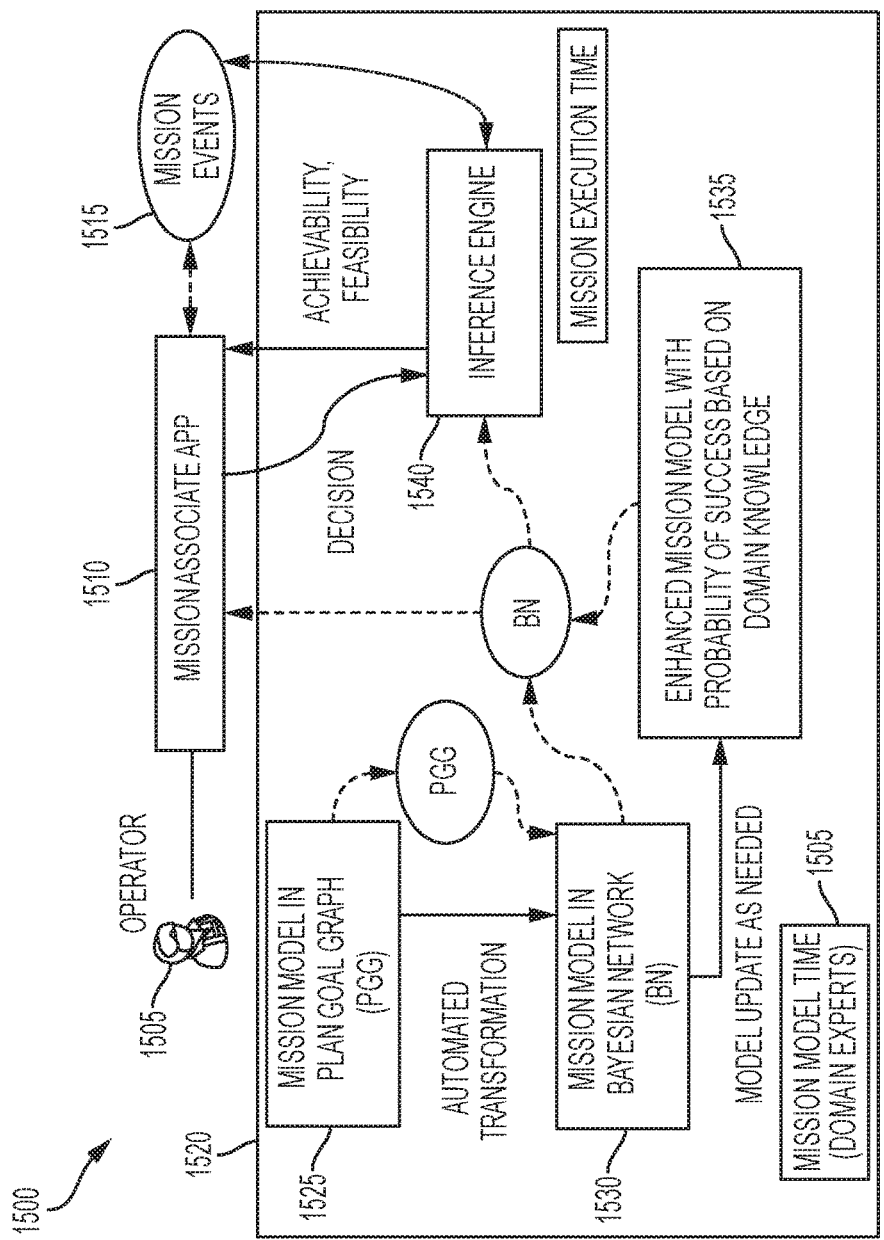
FIG. 15 shows an example of mission model development and transformation at the model generation time, and deployment and reasoning and operator intelligent assistance at mission execution time, according to examples of the present disclosure.

The methods described herein of automatically transforming mission models in PGG-based representation to corresponding models in BN-based representation and providing runtime reasoning in support of mission execution can be embedded in a variety of applications. For example, mission models in BN can be dynamically loaded and embedded in a Mission Associate application, providing intelligent assistance to the operator. FIG. 15 shows an example of mission model development and transformation at the model time, and deployment and reasoning and operator intelligent assistance at mission execution time 1500, according to examples of the present disclosure. An operator 1505 can execute an application 1510, e.g., a mission associate application, on a computer (not shown), i.e., a smart phone, laptop, tablet computer, desktop computer. The application 1510 can communicate with a control system 1520 and can obtain mission events 1515 from the operator 1505, the control system 1520, or another party. The control system 1520 provides a mission model in the form of a PGG 1525. The mission model in PGG is converted to a BN 1530. The mission model in BN is enhanced with probabilities of success based on domain knowledge 1535 and is provided to an inference engine 1540, which can then be provided to the application 1510. The mission model can be updated as needed using, for example, domain experts. The operator 1505 can make appropriate selection on the application 1510, which can then be provided to the inference engine 1540.

Figure 16:
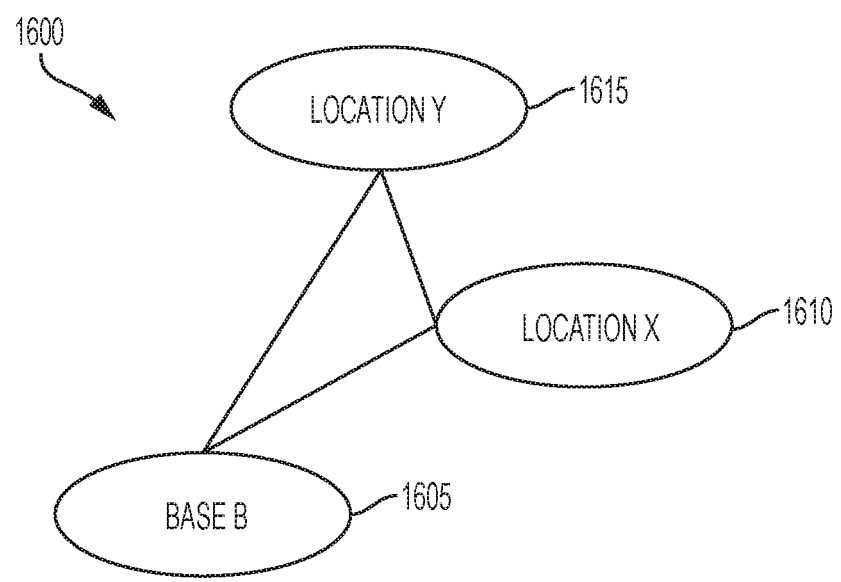
FIG. 16 show a material delivery scenario with the goal of delivering package E1 to Location X, and package E2 to Location Y, both from the Base B, within timeliness and cost constraints, according to examples of the present disclosure.

FIGS. 16-29 show an example material delivery scenario using the methods described herein, according to examples of the present disclosure. The material delivery can include, but is not limited to, medicine/parcel delivery in wild mountain ranges without good transportation infrastructure, emergency kits distribution after disaster where infrastructures are destroyed, routine outpost supply refilling from bases in Mars colony, or UGV parts and tools to assembly large factory. The above examples may include material pickup in addition to delivery. FIG. 16 show a material delivery scenario 1600 with the goal of delivering package E1 to Location X 1610, and package E2 to Location Y 1615, both from the Base B 1605, within timeliness and cost constraints. In this example, the resources and plans options include the following: available resources—two UAVs for simplicity, assuming identical capability); plan options—use one or two UAVs; and depends on packages' weights, weather condition (wind speeds, lightening, heavy rain/snow), and timeliness guarantees, it might be more or less feasible for a UAV to delivery one or two packages via a specific route segments at a scheduled delivery time. Also for this example, the environment and conditions include the following: base B 1605 is closer to Location X 1610 than to Location Y 1615 and Location X 1610 and Location Y 1615 are closer to each other than to Base B 1605; and weather conditions.

Figure 17:
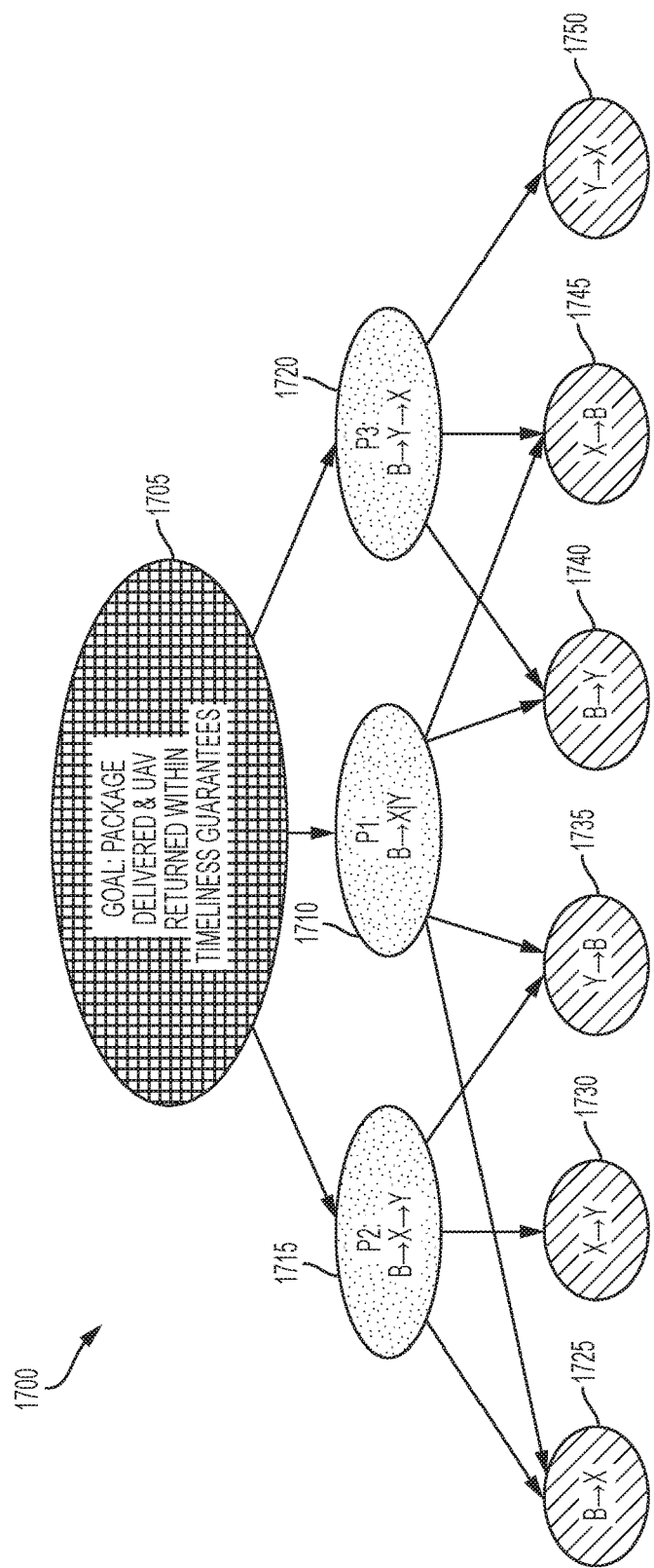
FIG. 17 shows a PGG for the material delivery scenario of FIG. 16.

FIG. 17 shows a PGG 1700 for the material delivery scenario of FIG. 16. The goal 1705 of this scenario is that the packaged is delivered and the UAV(s) returned within timeliness guarantees. Plan 1 (P1) 1710 is two UAVs working concurrently, each delivers one package to one location and flies back. In particular, P1 1710 is a first UAV (UAV 1) being tasked with proceeding from Base B 1605 to Location X 1610 and then back Base B 1605, which is represented as UAV1:B→X→B. A second UAV (UAV2) is tasked with proceeding from Base B 1605 to Location Y 1615 and then back to Base 1605, which is represented as UAV2: B→Y→B. Plan 2 (P2) 1715 is one UAV, from base B to location X, then to location Y then back to B (UAVx: B→X→Y→B). Plan 3 (P3) 1720 is one UAV, from base B to location Y, then to location X then back to B (UAVx: B→Y→X→B). It is possible to use a single UAV; B→X→B→Y→B, or B→Y→B→X→B, but this is ignored in these plans for simplicity. Bottom level sub-goals B→X 1725, X→Y 1730, Y→B 1735, B→Y 1740, Y→B 1745, and Y→X 1750 can be further decomposed, but the purpose here is to use a simple example to illustrate details described herein. As a result (for simplicity), it is assumed that their feasibility can be observed (or calculated externally) and hence treated as actions.

Figure 18:
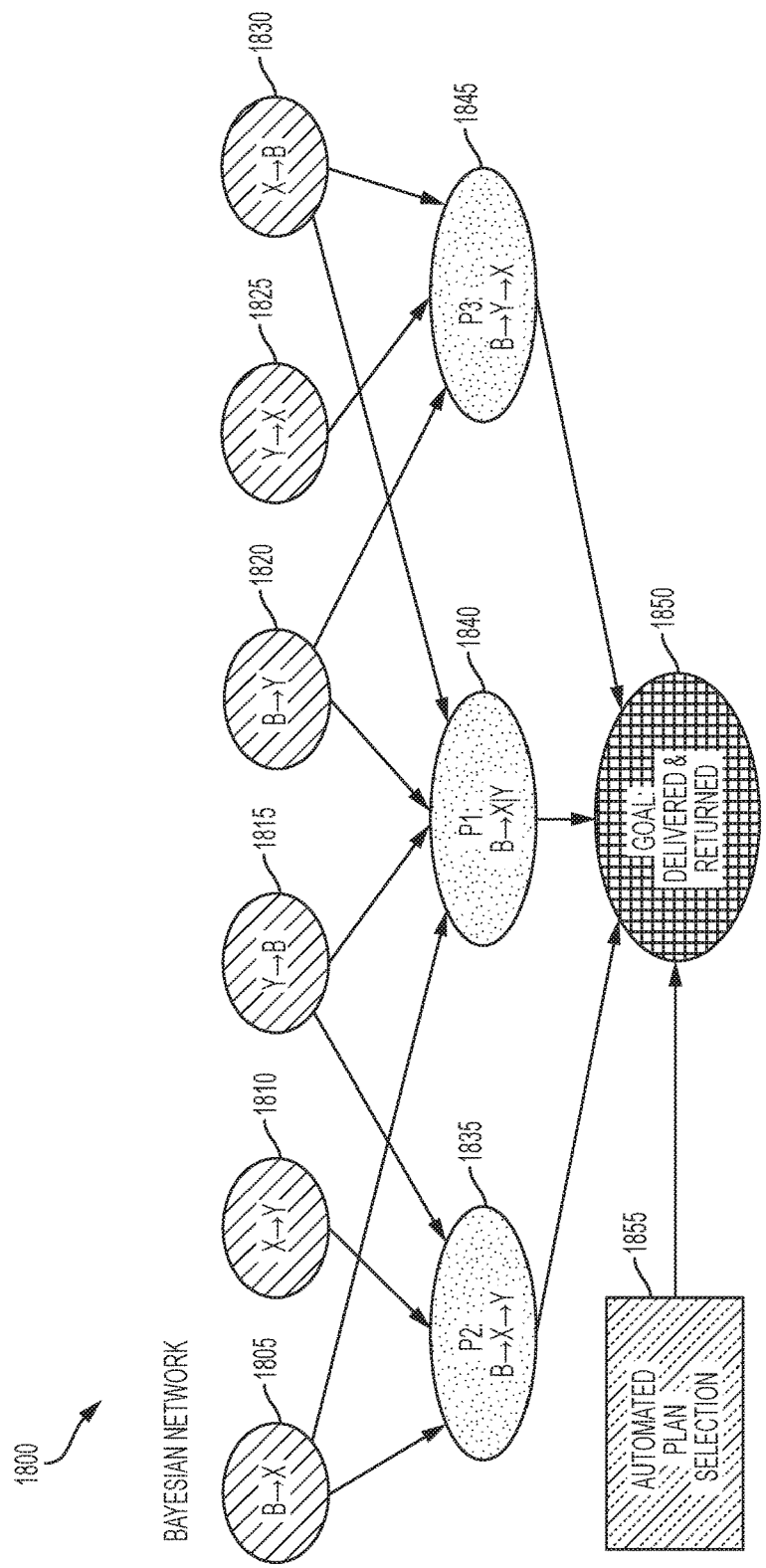
FIG. 18 shows a BN that has been transformed from the PGG of FIG. 17, according to the methods discussed herein.

FIG. 18 shows a BN 1800 that has been transformed from the PGG of FIG. 17, according to the methods discussed herein. The goal nodes include B→X 1805, X→Y 1810, Y→B 1815, B→Y 1820, Y→X 1825, and X→B 1830 and the plan nodes include P1: B→X→Y 1835, P2: B→Y→B 1840, and P3: B→Y→X 1845. The goal node 1850 is delivered and retuned and the decision node is the automated plan selection 1865. The probability of success for the primary goal node 1850 (delivered) is conditional (dependent) on the probability of success of the alternative plans P1: B→X→Y 1835, P2: B→Y→B 1840, and P3: B→Y→X 1845. A BN may also contain sequential dependencies between parentless nodes that are not directly represented in the hierarchical node & arrow representation. For example, in plan P2 1840, there is sequential dependency between B→X 1805 and X→Y 1810 and the probability of success for X→Y 1810 is conditional (dependent) on the probability of success for B→X 1805. FIG. 19 shows a CPT 1900 for the goal "Delivered" for the BN of FIG. 18.

Figure 20:
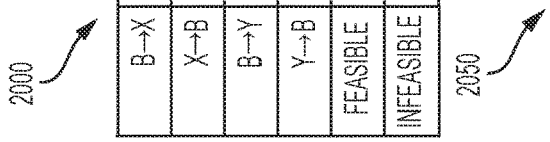
FIG. 20 shows CPTs for different conditions for plan 1 of FIG. 18.

FIG. 20 shows CPTs 2000 and 2050 for different conditions for plan 1 of FIG. 18. If there are sequential dependency on the sub-goals, all the sub-goals are partitioned from the same plan node into N parallel groups of sequential ones (B→X and X→B forms $1^{st}$ group, while B→Y and Y→B forms $2^{nd}$ group, N=2 in this example). Each group, if fully achieved, contributes 1/N to the plan feasibility. Within the group of K sub-goals (K=2 in this example), each sub-goal contribute to 1/K of the group contribution. In addition, the failure of a sub-goal will reduce its subsequent sibling sub-goals' contribution to a ratio ρ (say 80% in this example, in general, like ε, the ratio can be a configurable constant determine by human experts during mission planning). For example, failure of B→X reduce the contribution of X→B, but does not reduce the contribution of B→Y or Y→B FIG. 21 shows CPTs 2100 and 2150 for different conditions for plan 2 of FIG. 18. Using the analysis of the preceding paragraph, a single group of K=3 sub-goals is considered. Consider column 3 (AFA in sequence), B→X achieved contributes ⅓, Y→B achieved contributes ⅓ but reduced to (⅓)*80%=4/15. Hence total contribution is ⅓+4/15=9/15=0.6. Consider column 7 (FFA), Y→B achieved contributes ⅓ but reduced twice by 80%*80%=16/25, and hence total contribution is ⅓*(16/25)=16/75.

Figure 22:
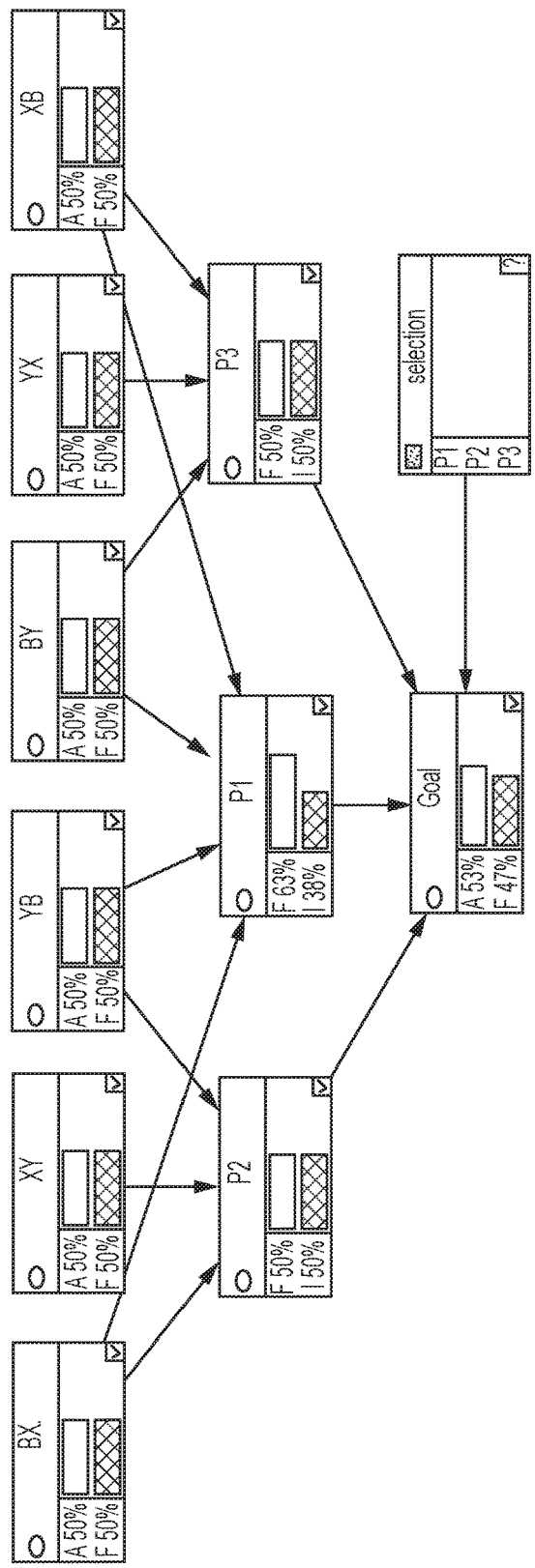
FIG. 22 shows a graphic representation of a first example of BN of FIG. 18 with the calculation of initial probabilities, propagation and calculation of conditional probabilities shown.

FIG. 22 shows a graphic representation of a first example of BN 1800 of FIG. 18 with the calculation of initial probabilities, propagation and calculation of conditional probabilities shown. In this example, no consideration of a sequential order is considered and no additional information is considered. The outcome of each top row plan is equally weighted A:50% F:50%, the plan probabilities calculated, the choice of plans are equally weighted, which results in a probability that the goal is achieved calculated to be 53%.

When no plan is selected as shown in FIG. 22, the achievability of the goal is the averaged value from three different options where one plan is selected in each option.

Figure 23:
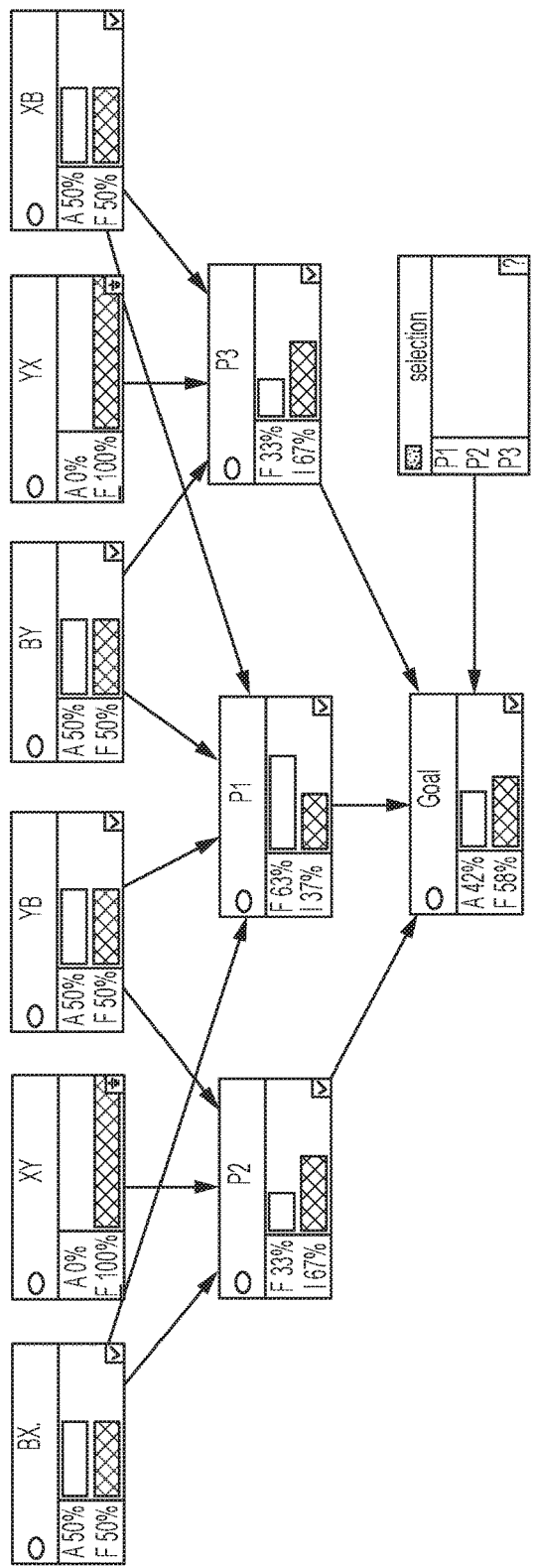
FIG. 23 shows a graphic representation of a second example of BN of FIG. 18 with the calculation of initial probabilities, propagation and calculation of conditional probabilities shown.

FIG. 23 shows a graphic representation of a second example of BN 1800 of FIG. 18 with the calculation of initial probabilities, propagation and calculation of conditional probabilities shown. In this example, no consideration of a sequential order is consider and the route between X and Y is considered to be blocked, as shown in the 100% failure condition between X→Y and X→Y. When the route between X→Y is blocked, either P2 or P3 can only carry out ⅓ and hence their feasibility is 33%. The top row plan probability and the plan probabilities updated based on these conditions. The choice of plans are equally weighted, which results in a probability that the goal is achieved calculated to be 42%.

Figure 24:
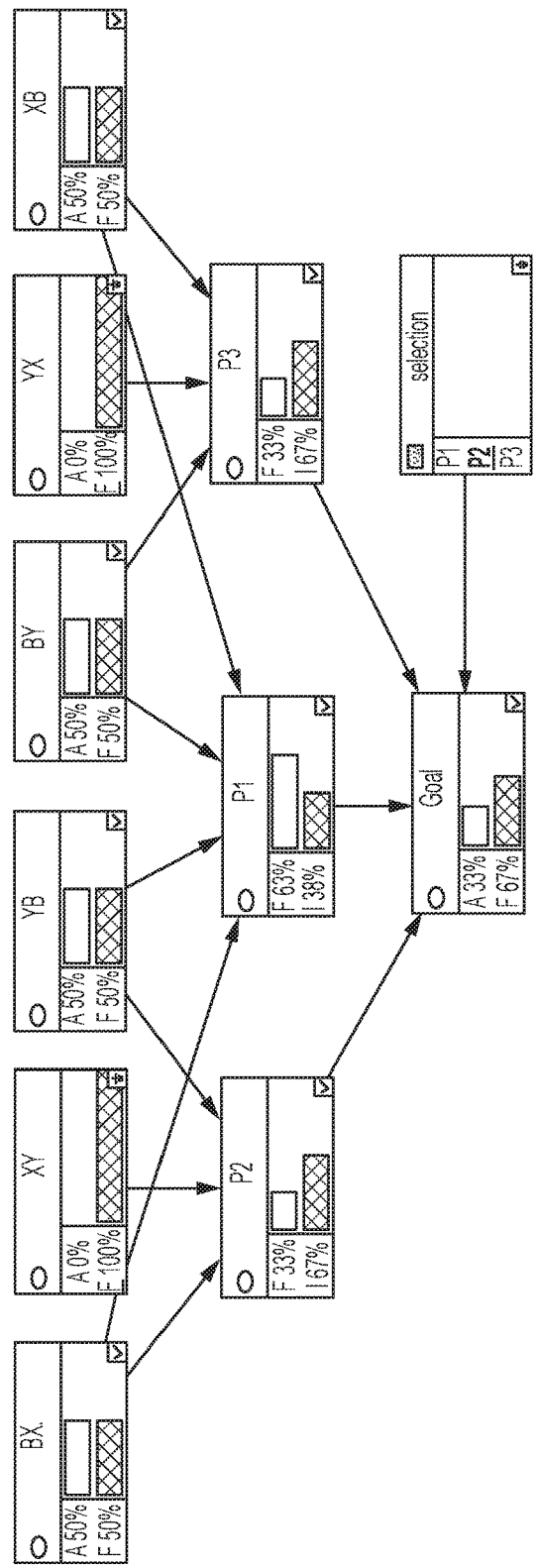
FIG. 24 shows a graphic representation of a third example of BN of FIG. 18 with the calculation of initial probabilities, propagation and calculation of conditional probabilities shown.

FIG. 24 shows a graphic representation of a third example of BN 1800 of FIG. 18 with the calculation of initial probabilities, propagation and calculation of conditional probabilities shown. In this example, no consideration of a sequential order is consider and the route between X and Y is considered to be blocked, similar to that as discussed in FIG. 23. The top row plan probability and the plan probabilities updated based on these conditions. Also, in this example, plan P2 is consider, which results in a probability that the goal is achieved calculated to be 33%.

Figure 25:
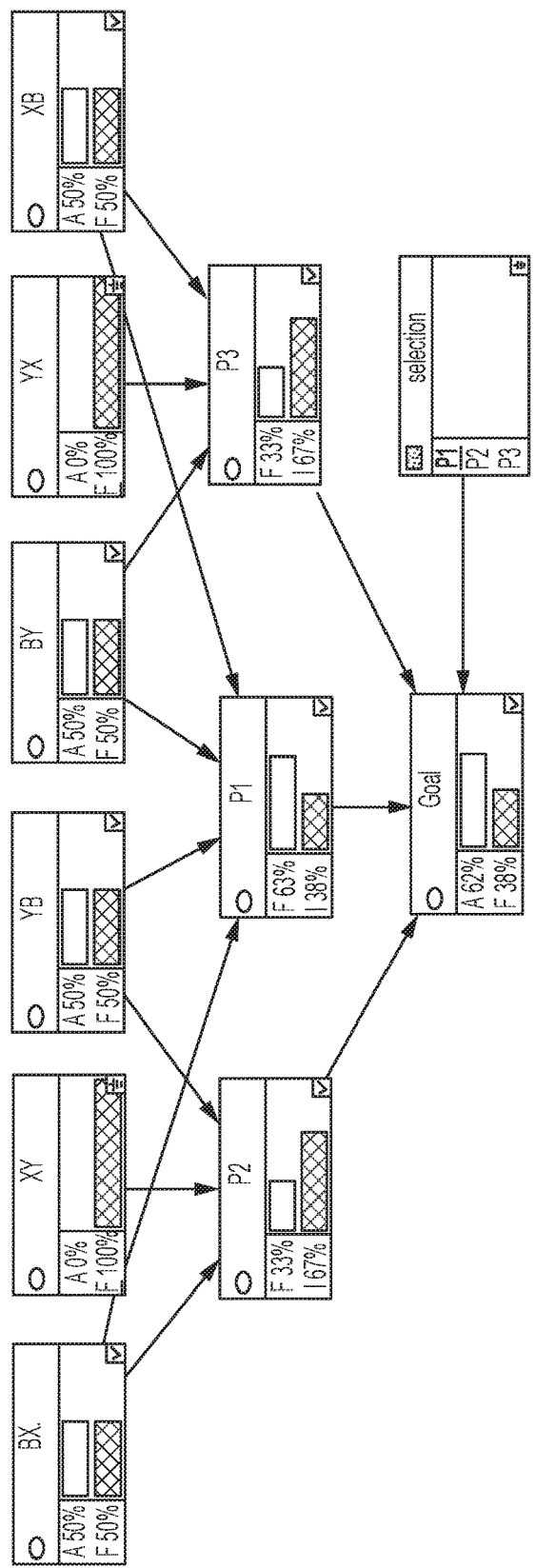
FIG. 25 shows a graphic representation of a fourth example of BN of FIG. 18 with the calculation of initial probabilities, propagation and calculation of conditional probabilities shown.

FIG. 25 shows a graphic representation of a fourth example of BN 1800 of FIG. 18 with the calculation of initial probabilities, propagation and calculation of conditional probabilities shown. In this example, no consideration of a sequential order is consider and the route between X and Y is considered to be blocked, similar to that as discussed in FIG. 23. The top row plan probability and plan P1 is consider. Since plan P1 does not depend on X→Y route, P1 has a much higher feasibility (but not 100% as B→X and B→Y route still has uncertainty). This results in a probability that the goal is achieved calculated to be 62%.

Figure 26:
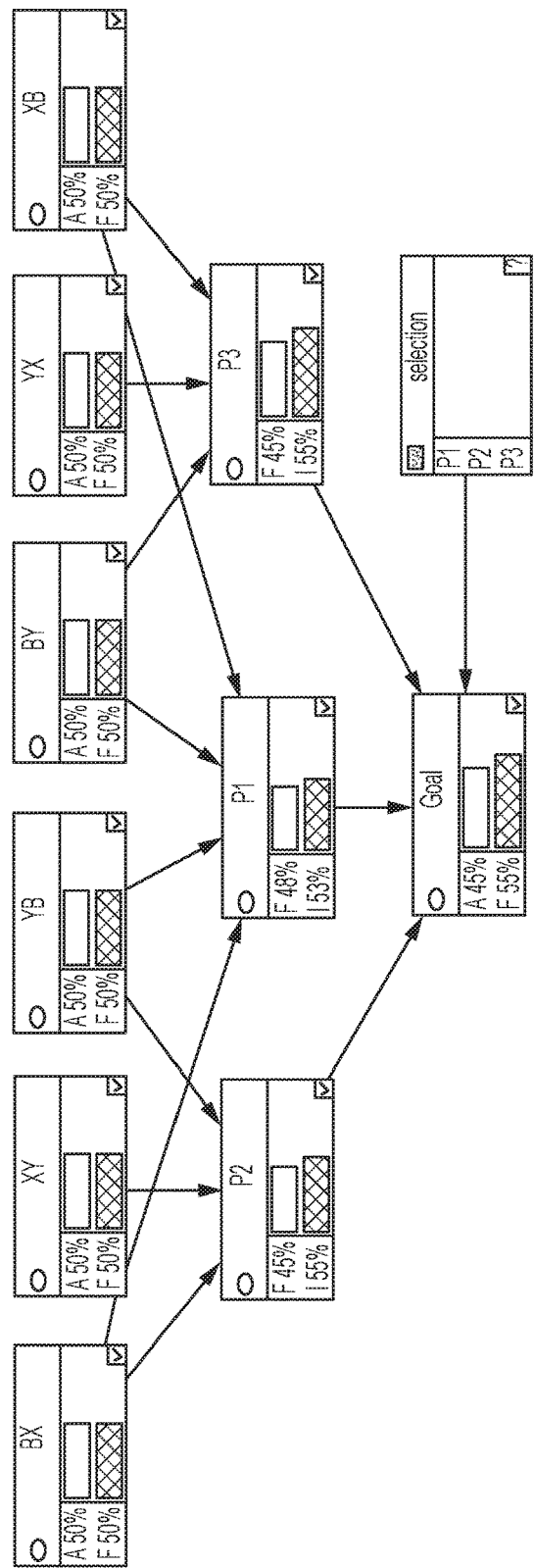
FIG. 26 shows a graphic representation of a fifth example of BN of FIG. 18 with the calculation of initial probabilities, propagation and calculation of conditional probabilities shown.

In the examples of FIGS. 22-25, the feasibility of all plans are reduced slightly due to sequential dependency. For example, when B→X fails in these examples, it does not change the contribution to P1 for the Achieved X→Y. However, in the below example, it does. FIG. 26 shows a graphic representation of a fifth example of BN 1800 of FIG. 18 with the calculation of initial probabilities, propagation and calculation of conditional probabilities shown. In this example, sequential order is consider and no other information is considered. The outcome of each top row plan is equally weighted A: 50% F: 50%, the plan probabilities are calculated (taking into consideration sequential order), and the choice of plans equally weighted. This results in a probability that the goal is achieved calculated to be 45%.

Figure 27:
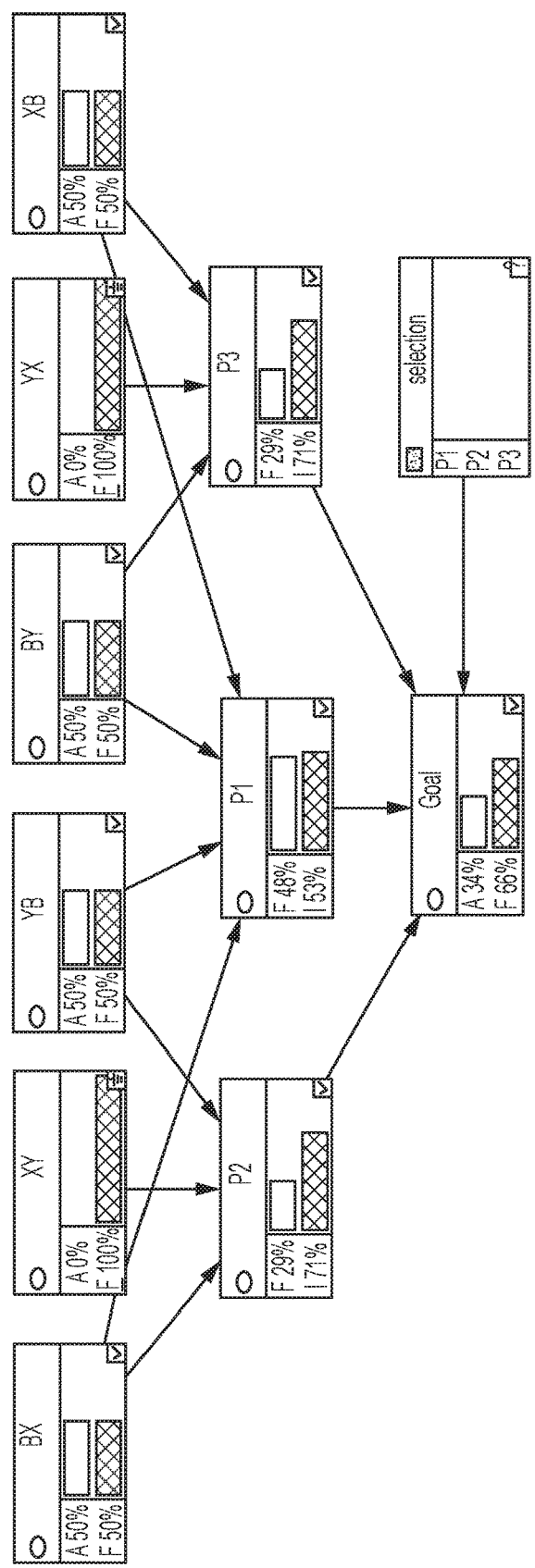
FIG. 27 shows a graphic representation of a sixth example of BN of FIG. 18 with the calculation of initial probabilities, propagation and calculation of conditional probabilities shown.

FIG. 27 shows a graphic representation of a sixth example of BN 1800 of FIG. 18 with the calculation of initial probabilities, propagation and calculation of conditional probabilities shown. In this example, sequential order is consider and the route between X and Y is considered to be blocked, similar to that as discussed in FIG. 23. The top row plan probability is updated and the choice of plans is equally weighted. This results in a probability that the goal is achieved calculated to be 34%.

Figure 28:
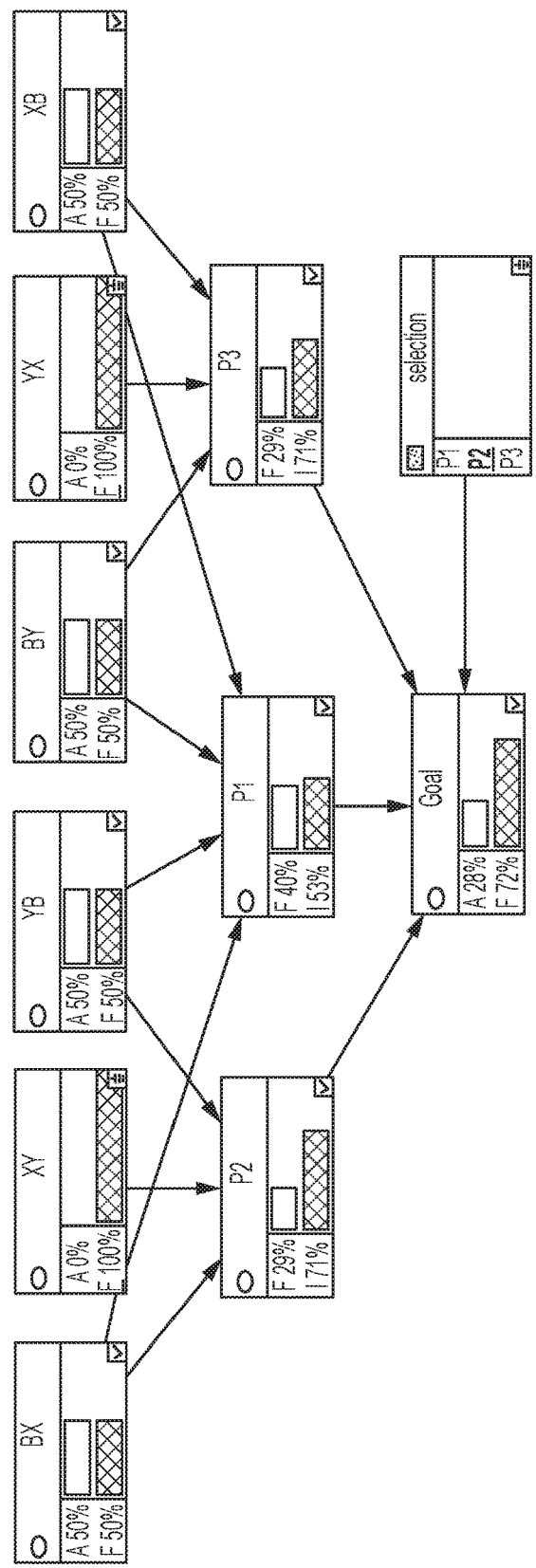
FIG. 28 shows a graphic representation of a seventh example of BN of FIG. 18 with the calculation of initial probabilities, propagation and calculation of conditional probabilities shown.

FIG. 28 shows a graphic representation of a seventh example of BN 1800 of FIG. 18 with the calculation of initial probabilities, propagation and calculation of conditional probabilities shown. In this example, sequential order is consider and the route between X and Y is considered to be blocked, similar to that as discussed in FIG. 23. The plan probabilities are updated and plan P2 is considered. This results in a probability that the goal is achieved calculated to be 28%.

Figure 29:
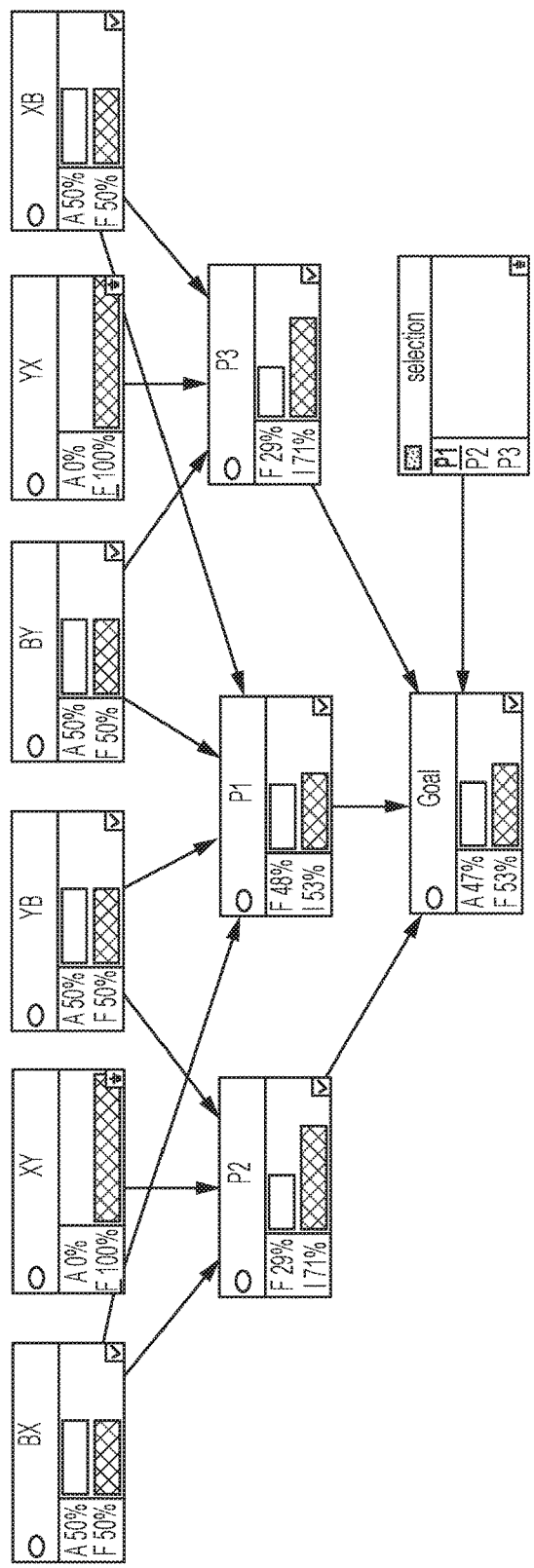
FIG. 29 shows a graphic representation of an eighth example of BN of FIG. 18 with the calculation of initial probabilities, propagation and calculation of conditional probabilities shown.

FIG. 29 shows a graphic representation of an eighth example of BN 1800 of FIG. 18 with the calculation of initial probabilities, propagation and calculation of conditional probabilities shown. In this example, sequential order is consider and the route between X and Y is considered to be blocked, similar to that as discussed in FIG. 23. The top row plan probability is updated, the plan probabilities are updated, and plan P1 is considered. This results in a probability that the goal is achieved calculated to be 47%.

In some examples, the above described systems and method can be used in an autonomous system control. The autonomous system control can accept a PGG and control parameters (ρ and ε) from a command center and can transform the PGG to a BN with conditional probability table using the control parameters. The autonomous system control can be configured to set initial probabilities of achieved to 50% for each parentless node (at top) in the BN and then to calculate the probabilistic of other nodes via BN propagation. The autonomous system control can be configured to use the pseudocode below:

---

Repeat
    Perform routine mission execution logic «e.g., situation assessment, acquiring information, evaluating the effect of alternative sub-plans, . . . Etc.»
        Wait pre-determined duration of time for new information
        If (new information available) then
            Update BN with new information
            Compute the probabilities of a Plan's Feasibility and a Goal's Achievability
            Determine the possible effect of selecting alternative sub-plans (including atomic actions) on the probability of a Goal's Achievability
            Update recommended course of actions (i.e., sequence of alternative sub-plans) based on new probabilities
        End If
        If (Action is required) then
            Perform selected sequence of alternative sub-plans
            Determine outcome
            Update BN with outcome
        End If
Repeat

---

The process can be repeated until the plan completes or is infeasible to continue.

In some examples, the autonomous system control can be configured with a backup configuration. In the backup configuration, all external factors can be aggregated into a single environmental condition factor for each of the three route segment (B←→X, B←→Y, X←→Y). As one example, the environment can be represented by an event that can be detected by a weather service and provided to the mission. The event can be characterized in conditions, e.g., [Favorable, Prohibitive, Workable]. When the environment is Favorable, both packages may be carried in a single UAB. When the environment is Prohibitive, no UAV can fly across the segment. Otherwise, the environment is Workable, only a single package may be carried in a single UAV. Note that there is always a small chance that the UAV may fail due to unforeseen conditions. In some examples, different environmental condition can be assigned for different route segment.

In some examples, the autonomous system control can include autonomous decision making. In this example, external events are some of the input in the decision loop. If, for example, the weather conditions have changed, a plan could be B→X, X→B, B→Y rather than B→X→Y→B. In other words, alternative plans can be consider to achieve the same goal. Other considerations can include timeliness and cost for a given condition (defined as the set of events, UAV conditions, etc.). In some examples, a human out-of-loop process can use external events to provide evidence to the BNN, where the achievability of the goal under each decision choice can be determined and can automatically take the choice with the maximum achievability.

Figure 30:
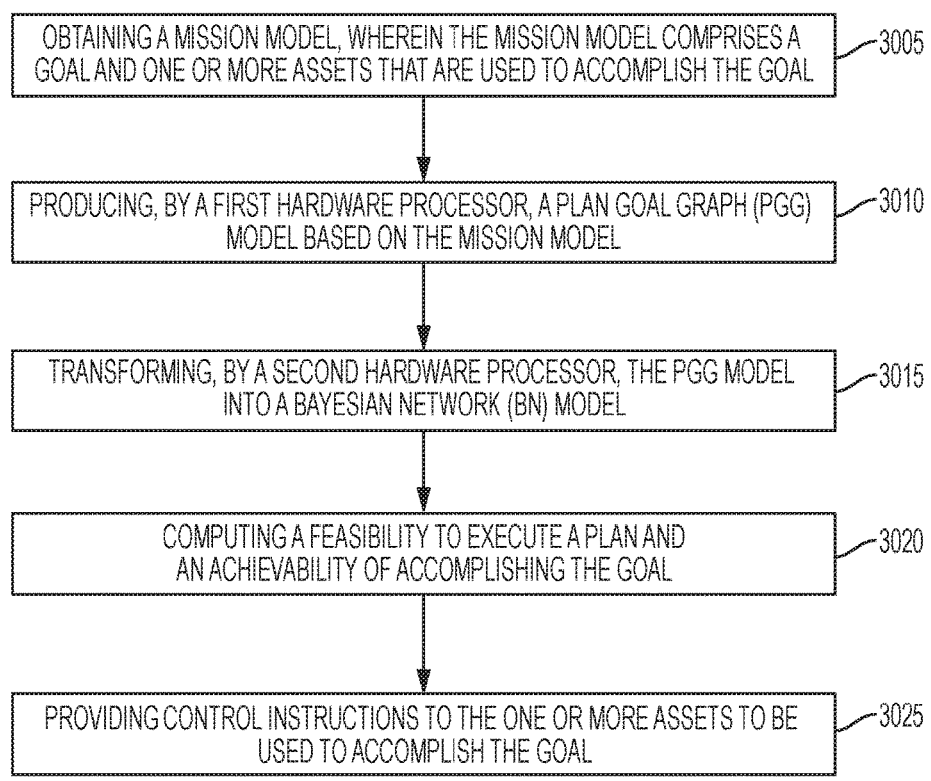
FIG. 30 shows a method for control of an autonomous or unmanned system, according to examples of the present disclosure.

FIG. 30 shows a method 3000 for control of an autonomous or unmanned system, according to examples of the present disclosure. The method 3000 begins by obtaining, at 3005, a mission model, wherein the mission model comprises a goal and one or more assets that are used to accomplish the goal. In some examples, the one or more assets can comprise an autonomous or unmanned system. In some examples, the one or more assets can comprise a robot equipped with wired or wireless communication, anthropomorphic hands and limbs, and a vision system. In some example, the one or more assets can comprise an autonomous air system, autonomous water system, or autonomous ground system. In some examples, the one or more assets can comprise one or more of: a wireless communication system, a cargo stowage unit, a material handling equipment unit, a vision system, or a global positioning system.

In some example, the PGG comprises the goal represented as a first parent node and one or more alternative plans to achieve the goal utilizing the one or more assets represented as one or more first child nodes to the first parent node, wherein the first parent node is connected to each of the one or more first child nodes by one or more first directed arcs.

In some example, the BN model comprises on or more alternative plans using the one or more assets represented as one or more second parent nodes and the goal represented as a second child node to the one or more second parent nodes, wherein the one or more second parent nodes are connected to the second child node by one or more second directed arcs.

The method 3000 continues by producing, at 3010, by a first hardware processor, a plan goal graph (PGG) model based on the mission model. The method 3000 continues by transforming, at 3015, by a second hardware processor, the PGG model into a Bayesian Network (BN) model. In some examples, the transforming comprises changing a first direction of the first directed arcs to a second direction of the second directed arcs and adding a decision node to the second child node. The method 3000 continues by computing, at 3020, a feasibility to execute a plan and an achievability of accomplishing the goal. The method 3000 continues by providing, at 3025, control instructions to the one or more assets to be used to accomplish the goal.

In some example, the method 3000 can further comprise defining one or more achievability variables for one or more goal nodes, defining one or more feasibility variables for one or more plan nodes, and a relationship between the one or more feasibility for the one or more plan nodes and the one or more achievability variables for the one or more goal nodes.

In some examples, the method 3000 can further comprise generating a conditional probability table for each node of the BN model that reflects a conditional probability distribution over one or more states of a node given different combinations of the one or more states of each second parent nodes. For example, a goal's achievability is computed based on a combination of available plans and their feasibilities, and decisions of selecting and executing those plans.

In some examples, the method 3000 can further comprise adding a risk factor and a scaling factor in the computation of a plan's feasibility and a goal's achievability.

In some examples, the BN model and a computation method of computing an achievability of a goal node and one or more feasibility variables for one or more plan nodes are embedded in a mission reasoning component of an autonomous or semi-autonomous system to provide reasoning and decisions based on computed best course of actions.

In some example, the first hardware processor and the second hardware processor can be the same or different processors.

Figure 31:
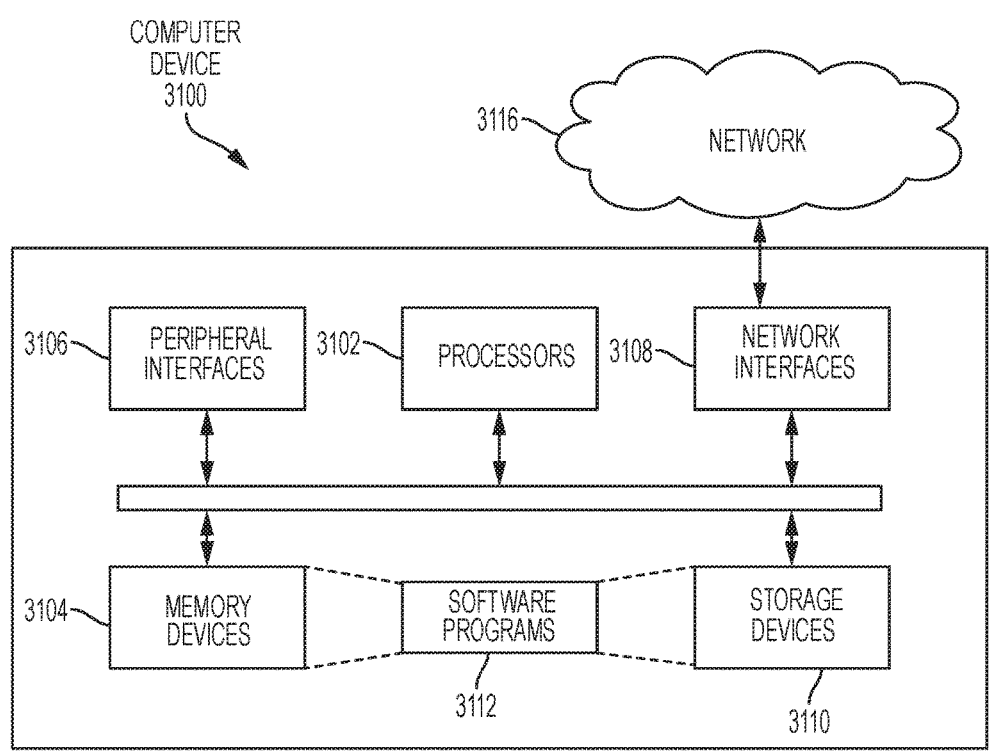
FIG. 31 is an example computer system for performing the disclosed implementations, consistent with the present disclosure.

FIG. 31 is an example computer system 3100 for performing the disclosed implementations, consistent with the present disclosure. The computer device 3100 can be any type of computer devices, such as desktops, laptops, servers, etc., or mobile devices, such as smart telephones, tablet computers, cellular telephones, personal digital assistants, etc. As illustrated in FIG. 31, the computer device 3100 can include one or more processors 3102 of varying core configurations and clock frequencies. The computer device 3100 can also include one or more memory devices 3104 that serve as a main memory during the operation of the computer device 3100. For example, during operation, a copy of the software that supports the operations discussed herein can be stored in the one or more memory devices 3104. The computer device 3100 can also include one or more peripheral interfaces 3106, such as keyboards, mice, touchpads, computer screens, touchscreens, etc., for enabling human interaction with and manipulation of the computer device 3100.

The computer device 3100 can also include one or more network interfaces 3108 for communicating via one or more networks, such as Ethernet adapters, wireless transceivers, or serial network components, for communicating over wired or wireless media using protocols. The computer device 3100 can also include one or more storage device 3110 of varying physical dimensions and storage capacities, such as flash drives, hard drives, random access memory, etc., for storing data, such as images, files, and program instructions for execution by the one or more processors 3102.

Additionally, the computer device 3100 can include one or more software programs 3112 that enable the functionality described above. The one or more software programs 3112 can include instructions that cause the one or more processors 3102 to perform the processes described herein. Copies of the one or more software programs 3112 can be stored in the one or more memory devices 3104 and/or on in the one or more storage devices 3110. Likewise, the data used by one or more software programs 3112 can be stored in the one or more memory devices 3104 and/or on in the one or more storage devices 3110.

In implementations, the computer device 3100 can communicate with other devices via a network 3116. The other devices can be any types of devices as described above. The network 3116 can be any type of electronic network, such as a local area network, a wide-area network, a virtual private network, the Internet, an intranet, an extranet, a public switched telephone network, an infrared network, a wireless network, and any combination thereof. The network 3116 can support communications using any of a variety of commercially-available protocols, such as TCP/IP, UDP, OSI, FTP, UPnP, NFS, CIFS, AppleTalk, and the like. The network 3116 can be, for example, a local area network, a wide-area network, a virtual private network, the Internet, an intranet, an extranet, a public switched telephone network, an infrared network, a wireless network, and any combination thereof.

The computer device 3100 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 3100 as described above need not be enclosed within a single enclosure or even located in close proximity to one another. Those skilled in the art will appreciate that the above-described componentry are examples only, as the computer device 3100 can include any type of hardware componentry, including any necessary accompanying firmware or software, for performing the disclosed implementations. The computer device 3100 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A method for control of an autonomous or unmanned system comprising:
    obtaining a mission model, wherein the mission model comprises a goal and one or more assets that are used to accomplish the goal;
    producing by a first hardware processor, a plan goal graph (PGG) model based on the mission model, wherein the PGG comprises the goal represented as a first parent node and one or more alternative plans to achieve the goal utilizing the one or more assets represented as one or more first child nodes to the first parent node, wherein the first parent node is connected to each of the one or more first child nodes by one or more first directed arcs;
    transforming, by a second hardware processor, the PGG model into a Bayesian Network (BN) model;
    computing a feasibility to execute a plan and an achievability of accomplishing the goal; and
    providing control instructions to the one or more assets to be used to accomplish the goal.

2. The method of claim 1, wherein the one or more assets comprise an autonomous or unmanned system.

3. The method of claim 1, wherein the BN model comprises one or more alternative plans using the one or more assets represented as one or more second parent nodes and the goal represented as a second child node to the one or more second parent nodes, wherein the one or more second parent nodes are connected to the second child node by one or more second directed arcs.

4. The method of claim 3, wherein the transforming comprises changing a first direction of the first directed arcs to a second direction of the second directed arcs and adding a decision node to the second child node.

5. The method of claim 4, further comprising defining one or more achievability variables for one or more goal nodes, defining one or more feasibility variables for one or more plan nodes, and a relationship between the one or more feasibility variables for the one or more plan nodes and the one or more achievability variables for the one or more goal nodes.

6. The method of claim 4, further comprising generating a conditional probability table for each node of the BN model that reflects a conditional probability distribution over one or more states of a node given different combinations of one or more states of each second parent nodes.

7. The method of claim 4, further comprising adding a risk factor and a scaling factor in the computing the feasibility and the achievability.

8. The method of claim 1, wherein the BN model and a computation method of computing an achievability of a goal node and one or more feasibility variables for one or more plan nodes are embedded in a mission reasoning component of an autonomous or semi-autonomous system to provide reasoning and decisions based on computed best course of actions.

9. The method of claim 1, wherein the first hardware processor and the second hardware processor are different processors.

10. The method of claim 1, wherein the one or more assets comprise a robot equipped with wired or wireless communication, anthropomorphic hands and limbs, and a vision system.

11. The method of claim 1, wherein the one or more assets comprise an autonomous air system, autonomous water system, or autonomous ground system.

12. The method of claim 1, wherein the one or more assets comprise one or more of: a wireless communication system, a cargo stowage unit, a material handling equipment unit, a vision system, or a global positioning system.

13. A computing system comprising:
at least one hardware processor;
a non-transitory computer-readable medium storing instruction, that when executed by the at least one hardware processor, perform a method for control of an autonomous or unmanned system, the method comprising:
obtaining a mission model, wherein the mission model comprises a goal and one or more assets that are used to accomplish the goal;
producing a plan goal graph (PGG) model based on the mission model, wherein the PGG (100) comprises the goal represented as a first parent node and one or more alternative plans to achieve the goal utilizing the one or more assets represented as one or more first child nodes to the first parent node, wherein the first parent node is connected to each of the one or more first child nodes by one or more first directed arcs;
transforming the PGG model into a Bayesian Network (BN) model;
computing a feasibility to execute a plan and an achievability of accomplishing the goal; and
providing control instructions to the one or more assets to be used to accomplish the goal.

14. The computing system of claim 13, wherein the one or more assets comprise an autonomous or unmanned system.

15. The computing system of claim 13, wherein the BN model comprises one or more alternative plans using the one or more assets represented as one or more second parent nodes and the goal represented as a second child node to the one or more second parent nodes, wherein the one or more second parent nodes are connected to the second child node by one or more second directed arcs.

16. The computing system of claim 15, wherein the transforming comprises changing a first direction of the first directed arcs to a second direction of the second directed arcs and adding a decision node to the second child node.

17. The computing system of claim 16, wherein the at least one hardware processor is operable to perform the method further comprising defining one or more achievability variables for one or more goal nodes, defining one or more feasibility variables for one or more plan nodes, and a relationship between the one or more feasibility variables for the one or more plan nodes and the one or more achievability variables for the one or more goal nodes.

18. The computing system of claim 16, wherein the at least one hardware processor is operable to perform the method further comprising generating a conditional probability table for each node of the BN model that reflects a conditional probability distribution over one or more states of a node given different combinations of one or more states of each second parent nodes.

19. The computing system of claim 13, wherein the BN model and a computation method of computing an achievability of a goal node and one or more feasibility variables for one or more plan nodes are embedded in a mission reasoning component of an autonomous or semi-autonomous system to provide reasoning and decisions based on computed best course of actions.

20. The computing system of claim 13, wherein the computing system comprises the autonomous or the unmanned system.

21. The computing system of claim 13, wherein the computing system is a system that is separate from the autonomous or the unmanned system.

* * * * *